(12) United States Patent
Shehab et al.

(10) Patent No.: US 6,751,557 B1
(45) Date of Patent: Jun. 15, 2004

(54) ROCK CLASSIFICATION METHOD AND APPARATUS

(75) Inventors: Gamal Shehab, Gretna, LA (US); Anish Kumar, River Ridge, LA (US); George Richard Kear, Slidell, LA (US); Oswaldo E. Viloria, Kenner, LA (US); David Williamson, Slidell, LA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/338,380

(22) Filed: Jan. 8, 2003

(51) Int. Cl.$^7$ ................................................. G01V 3/18
(52) U.S. Cl. .................................. 702/11; 702/7; 702/8
(58) Field of Search ............................... 702/11, 12, 13, 702/7, 8; 324/303

(56) References Cited

U.S. PATENT DOCUMENTS

| | | | |
|---|---|---|---|
| 5,502,686 A | 3/1996 | Dory et al. | |
| 6,366,087 B1 * | 4/2002 | Coates et al. | ................ 324/303 |
| 6,571,619 B2 * | 6/2003 | Herron et al. | ............... 324/303 |

FOREIGN PATENT DOCUMENTS

| | | |
|---|---|---|
| WO | 01/51880 | 7/2001 |
| WO | 02/086459 | 10/2002 |

OTHER PUBLICATIONS

*A New Micro–Resistivity Imaging Device for Use In Oil–Based Mud*, By Lofts, J., Evans, M., Pavlovic, M. Dymmock, S., published for the SPWLA 43$^{rd}$ Annual Logging Symposium, Jun. 2–5, 2002 (14 pages).

Advertising Brochured from Computalog (High Resolution Micro Imager) published in 2002 *Enhance your image with Computalog's High Resolution Micro Imager* (HMI ™ ).

Geological Systems, Imaging—Simultaneous Acoustic and Resistivity (STAR Imager$^{SM}$ ), High–resolution geological and petrophysical reservoir evaluation. [Retrieved from Baker Hughes website on Dec. 5, 2002] at <www.baker-huges.com/bakeratlas/geology/star_index.htm>.

Service Overview, Geology, Imaging, (Simultaneous Acoustic and Resistivity Imager) [Retrieved from Baker Hughes website on Dec. 5, 2002] <www.bakerhughesdirect.com/cgi–bin/atlas/ATLAS/atlasDispatcher/jsp?Workflow=A. .>.

\* cited by examiner

*Primary Examiner*—Donald McElheny, Jr.
(74) *Attorney, Agent, or Firm*—Brigitte L. Jeffery, John Ryberg

(57) ABSTRACT

A rock classification system involves the use of a Ternary Diagram (TD) Model and a set of rules in a rule base. A computer, which stores a rock classification software which includes the rule base, will be responsive to certain data points from a Spectroscopy Sonde, will compare each data point with each of the rules in the rule base, and, when a match is found, will generate a specific rock classification for that data point. When a plurality of data points are input to the computer, a corresponding plurality of rock classifications are generated.

40 Claims, 35 Drawing Sheets

MICRO-RESISTIVITY RULES FOR iCORE (ITEM 1) FILTER SPECTROSCOPY TERNARY DIAGRAM OUTPUTS FOR RELEVANT BED THICKNESS. FILTER MICRO-RESISTIVITY DATA FOR QUALITY AND NOISE (ITEM 2) BASED ON COMPARISONS TO INPUT MICRO-RESISTIVITY CUTOFF VALUE, CLASSIFY MICRO-RESISTIVITY AS HIGH OR LOW (ITEM 3) IF SPECTROSCOPY TERNARY DIAGRAM FACIES IS ONE OF THE FOLLOWING ROCK CLASSIFICATIONS: CLEAN SAND, SAND, SHALY SAND, CALCAREOUS SAND, OR CARBONATE; AND, IF THE RESISTIVITY VALUE IS CLASSIFIED AS LOW, THEN, AT THAT DEPTH INTERVAL, SHALE BEDDING OVERRIDES.

(ITEM 4) IF SPECTROSCOPY TERNARY DIAGRAM FACIES IS ONE OF THE FOLLOWING ROCK CLASSIFICATIONS: PELAGIC SHALE, SHALE, SANDY SHALE, OR CALCAREOUS SAND; AND, IF THE RESISTIVITY VALUE IS CLASSIFIED AS HIGH, THEN, AT THAT DEPTH INTERVAL, SAND BEDDING OVERRIDES.

*FIG. 12B*

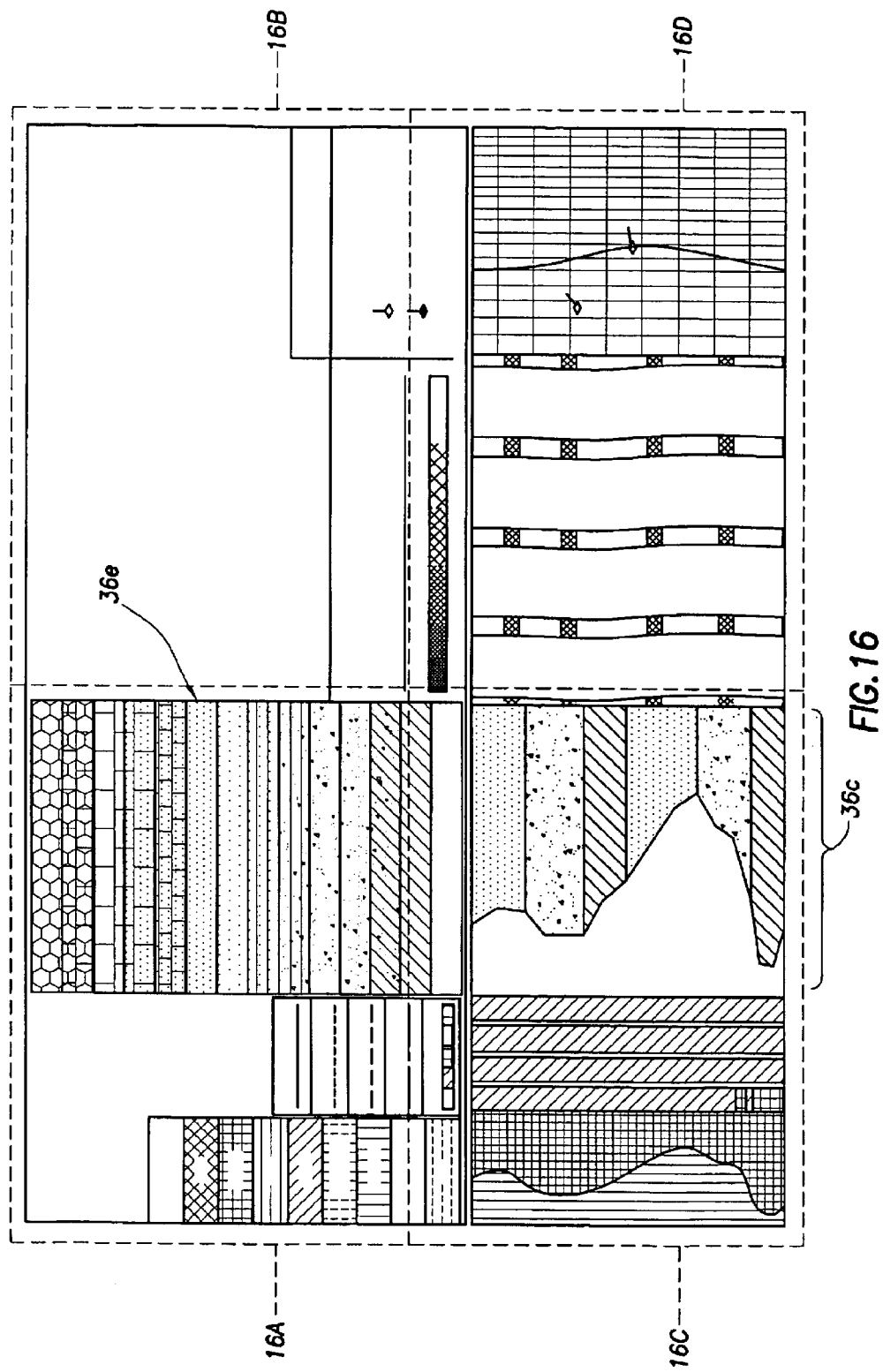

ROCK CLASSIFICATION METHOD AND APPARATUS

BACKGROUND OF THE INVENTION

The subject matter of the present invention relates to a method and apparatus for generating a first plurality of rock classifications corresponding to a plurality of dry weight outputs from a well logging tool adapted to be disposed in a wellbore in response to a Ternary Model Diagram and a corresponding established rule base and for generating an output log including a second plurality of rock classifications as a function of depth in the wellbore, the second plurality of rock classifications being refined relative to the first plurality of rock classifications.

It has always been a challenge to Petroleum Geologists worldwide to find a means to examine and understand the geological characteristics of subsurface lithologic formations. Technological advances in the industry have made it possible to acquire measurements of the physics of the subsurface rocks and even provide images of the subsurface borehole geology. Sensors and tools are now available that provide the ability to not only obtain a high resolution image of the borehole but also allow for structural and stratigraphic interpretation, including thin-bed detection, compartmentalization, high-resolution net-pay calculation and well correlation. Another very useful tool sensor is a borehole spectroscopy tool. This tool provides the general elemental composition of the rock and its quantitative geochemical lithology. This data adds value to the geoscience disciplines including geology, geophysics, petrophysics, reservoir engineering, and production engineering, since the total QFM, the total clay content and the total carbonate fractions are accurately estimated (the term 'QFM' indicating Quartz, Feldspar, and Mica). However, studies based solely on borehole images or only on borehole spectroscopy data are not able to provide comprehensive subsurface geological description and interpretation solutions. Images alone cannot distinguish wet sand from shale, or a calcareous (limy) streak from a thin hydrocarbon rich sand bed. Spectroscopy outputs alone cannot resolve small geological features, such as thin sand beds.

As a result, a need exists which: (1) will address the aforementioned problems, (2) will use the strengths of the spectroscopy tools in general, (3) will use the strengths of both the borehole imaging tools and the spectroscopy tools in particular, and (4) will further enhance subsurface geological description and interpretation.

SUMMARY OF THE INVENTION

A first rock classification method and apparatus, which represents a first rock classification system, has been developed to classify rocks in response to a set of spectroscopy data from an Elemental Capture Spectroscopy Sonde and to generate a resulting output that will improve subsurface geological interpretation including reservoir characterization. The resulting output of this first rock classification system (i.e., a plurality of rock classifications corresponding, respectively, to a plurality of data points in the spectroscopy data) is used by an additional more refined rock classification system called 'iCore'.

In addition, a second rock classification method and apparatus, which represents a second rock classification system, has been developed which will merge the data obtained from two kinds of borehole measurement devices [i.e., the Elemental Capture Spectroscopy Sonde and the Oil Based Mud Imaging (OBMI) Sonde] and will use the rock classification system of the first rock classification system to provide a second resulting output that will improve subsurface geological interpretation including reservoir characterization. The second resulting output of this second rock classification system is a well log representing a refined rock classification system called the 'iCore lithofacies' log or the 'iCore' rock classification log.

The first rock classification system involves the use of a Ternary Diagram (TD) Model. The Ternary Diagram Model, or TD model, is a triangularly shaped model having three axes, WCAR representing the percent dry weight of total Carbonate, WSAN representing the percent dry weight of total QFM, and WCLA representing the percent dry weight of total Clay. The TD model includes twelve (12) rock classifications having specific enclosed boundaries in the TD model: marl, pelagic shale, shale, sandy shale, shaly sand, sand, clean sand, calcareous sand, calcareous shale, carbonate, sandy carbonate, and shaly carbonate. Since each of the twelve rock classifications in the TD model have specific enclosed boundaries, those enclosed boundaries are defined by certain percentages of dry weight on each of the three WCAR, WSAN, and WCLA axes. As a result, those enclosed boundaries in the TD model will define a set of rules which are hereinafter called the 'rule base'. The rule base, shown in FIG. 3, defines marl, for example, as having a percent dry weight of total Clay on the WCLA axis as being greater then or equal to 0.35 and less than or equal to 0.65 and a percent dry weight of total Carbonate on the WCAR axis as being greater than or equal to 0.35 and less than or equal to 0.65. Similarly, the rule base defines pelagic shale as having a percent dry weight of total Clay on the WCLA axis as being greater than or equal to 0.7. In FIG. 3, the rule base also has a specific definition (in terms of percent dry weight of total QFM or total Clay or total Carbonate) for shale, sandy shale, shaly sand, sand, clean sand, calcareous sand, calcareous shale, carbonate, sandy carbonate, and shaly carbonate. A computer, workstation or personal computer stores the rule base and a rock classification software. The computer is responsive to certain data points which are generated by a well logging tool known as the Elemental Capture Spectroscopy Sonde (ECS) which is owned and operated by Schlumberger Technology Corporation of Houston, Tex. The data points each comprise a percent dry weight of total carbonate, total QFM, and total clay. The computer process will compare each data point with each of the rules in the rule base, and, when a match is found, a specific rock classification for that data point is generated. When a plurality of data points are input to the computer, a corresponding plurality of rock classifications are generated. As a result, the first rock classification system uses the Ternary Diagram Model, and the rule base generated therefrom, to produce a plurality of rock classifications for each of the data points generated by the ECS well logging tool.

The second rock classification system involves the use of a second rule base and the aforementioned Ternary Diagram Model stored in the memory of a computer, workstation or personal computer. Another well logging tool known as the Oil Based Mud Imaging (OBMI) Sonde generates four tracks as a function of depth in a wellbore representative of an Earth formation inside the wellbore, the four tracks corresponding to four pads on the OBMI Sonde. The computer receives 'three sets of input data': (1) the four tracks as a function of depth that is output from the OBMI Sonde, (2) the certain data points generated by the Elemental Capture Spectroscopy Sonde where each data point comprises a percent dry weight of total carbonate, total QFM, and total clay, and (3) the rule base associated with the Ternary Diagram Model. In response to the 'three sets of input data', the second rule base stored in the computer will generate an output 'log' which is hereinafter called a 'Refined Lithofacies' or 'iCore Lithofacies' or 'iCore rock classification'. The 'iCore Lithofacies' output is a 'log', and that 'log' includes a first part which was previously present on that log: an output from the ECS sonde, a quality control track from the OBMI sonde, and the four tracks as a function of depth from the OBMI sonde. However, that 'log' also includes a new and novel second part: an 'iCore' rock classification (otherwise known as a 'Refined Lithofacies' or an 'iCore lithofacies') section as a function of depth. For each depth on the 'log', a color and/or symbol can be seen on the 'iCore lithofacies' part of the 'log'. That color and/or symbol can be matched to one of a plurality of 'rock classifications' where those 'rock classifications' could include the twelve (12) rock classifications illustrated in FIG. 3 and previously defined: marl, pelagic shale, shale, sandy shale, shaly sand, sand, clean sand, calcareous sand, calcareous shale, carbonate, sandy carbonate, and shaly carbonate. Therefore, for each wellbore-depth of the 'iCore lithofacies' log that is output by the second rule base of the computer, a user can determine the following formation characteristics pertaining to a particular part of the Earth formation at a particular depth in the wellbore: (1) a percent dry weight of total carbonate, total QFM, and total clay associated with the particular part of the formation at the particular depth of the wellbore as output from the ECS sonde, (2) a rock classification associated with the particular part of the formation at the particular depth of the wellbore (one of a plurality of rock classifications such as the twelve rock classifications in the Ternary Diagram Model of FIG. 3), and (3) a set of Earth formation characteristics on an interior wall of the wellbore (as illustrated by the four tracks) associated with the particular part of the formation at the particular depth of the wellbore.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 12A and 12B illustrate a more detailed block diagram depicting the structure and function of the second rule base of FIGS. 5 and 11 stored in the computer system of FIG. 5;

FIGS. 14, 14A, 14B, 14C, 14D, 15, 15A, 15B, 15C, 15D, 16, 16A, 16B, 16C, 16D, 17, 17A, 17B, 17C, and 17D illustrate other embodiments of the 'Refined Lithofacies' output log of FIG. 13.

DETAILED DESCRIPTION OF THE PREFERRED EMBODIMENT

Referring to FIGS. 1, 2, 3, and 4, a first rock classification method and apparatus in accordance with one aspect of the present invention, representing a first rock classification system, is illustrated. The first rock classification system was developed to classify rocks in response to a set of spectroscopy data from an Elemental Capture Spectroscopy Sonde and to generate a resulting output that will improve subsurface geological interpretation including reservoir characterization.

Figure 1:
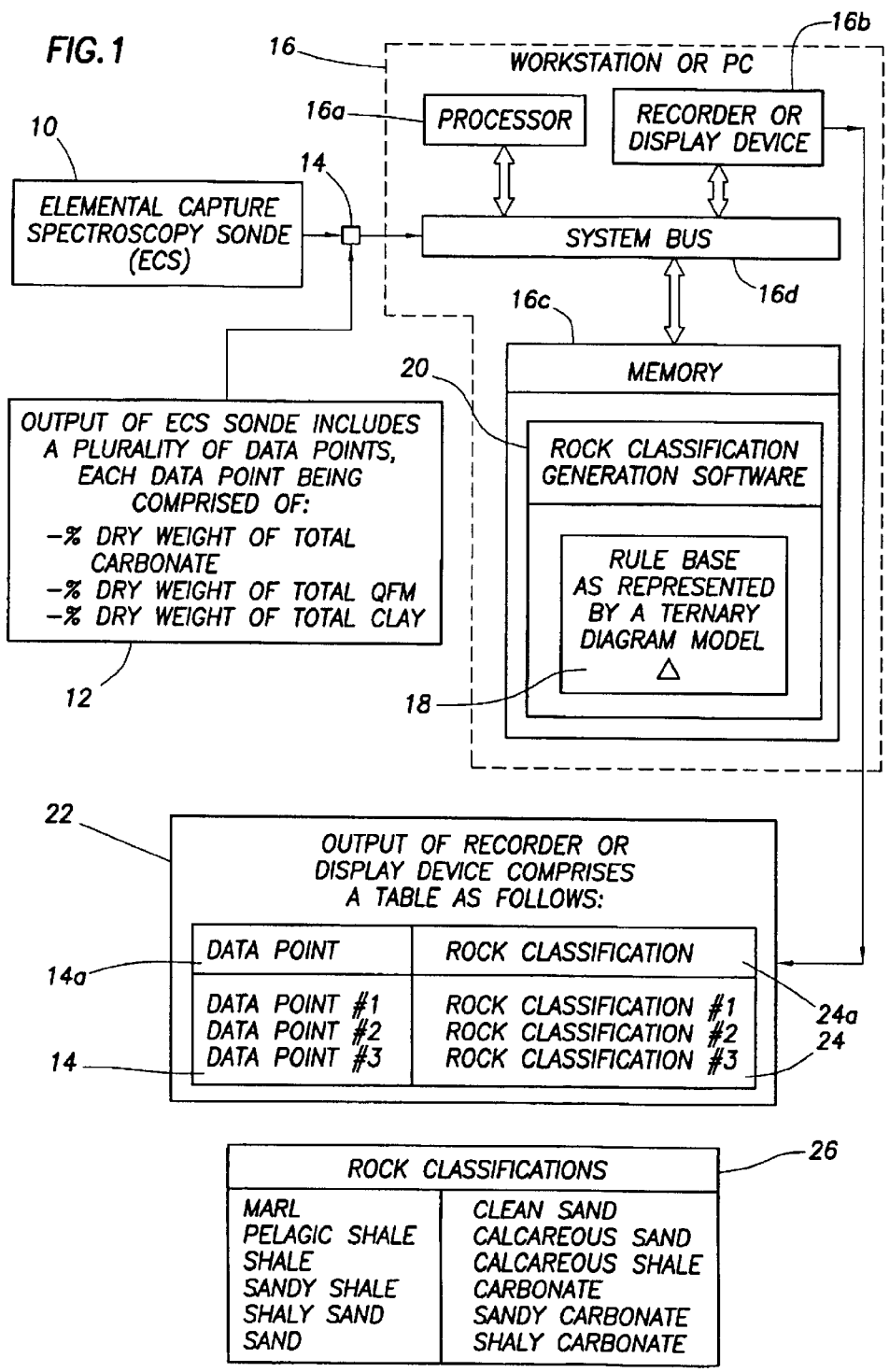
FIG. 1 illustrates a computer system which stores the Ternary Diagram Model for generating a plurality of rock classifications corresponding, respectively, to a plurality of data points which are output from the Elemental Capture Spectroscopy Sonde.

In FIG. 1, a workstation, personal computer or other computer system is illustrated. The computer system of FIG. 1 is responsive to output data that is generated by an Elemental Capture Spectroscopy (ECS) Sonde 10, a sonde which is owned and operated by Schlumberger Technology Corporation of Houston, Tex. Referring to block 12 of FIG. 1, the output 14 from the ECS sonde 10 includes a plurality of data points, where each data point is comprised of the following information as illustrated by block 12 of FIG. 1: (1) the percent (%) dry weight of total Carbonate, (2) the percent (%) dry weight of total QFM, and (3) the percent (%) dry weight of total Clay. Therefore, the output line 14 in FIG. 1, which represents the output 14 from the ECS sonde 10, includes a plurality of data points, where each data point that is output from the ECS sonde 10 includes: a percent dry weight of total Carbonate, a percent dry weight of total QFM, and a percent dry weight of total Clay. A computer system 16, which can be a workstation or personal computer, receives the plurality of data points on the output line 14 from the ECS sonde. The computer system 16 includes a processor 16a, a recorder or display device 16b, and a memory 16c, all of which are operatively connected to the system bus 16d. The memory 16c stores a rock classification generation software 20 therein, the rock classification generation software 20 including a rule base 18 as represented by a Ternary Diagram Model 30 in FIG. 2. The processor 16a is adapted to execute the rock classification generation software 20 using the rule base 18 in response to the plurality of data points, on output line 14, that are generated by the ECS sonde 10. When the processor 16a completes its execution of the rock classification generation software 20, the processor 16a will instruct the recorder or display device 16b to generate an 'output record medium', where the 'output record medium' stores or includes a rock classification table 22. The rock classification table 22 will record or include the plurality of data points 14 that are output from the ECS sonde 10 and a plurality of rock classifications 24 which correspond, respectively, to the plurality of data points 14. Therefore, a rock classification 24a will be associated with each data point 14a. In FIG. 1, referring to numeral 26, the aforementioned plurality of rock classifications 24 include the following twelve (12) rock classifications: marl, pelagic shale, shale, sandy shale, shaly sand, sand, clean sand, calcareous sand, calcareous shale, carbonate, sandy carbonate, and shaly carbonate. In FIG. 1, the computer 16 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The memory 16c is a computer readable medium or a program storage device which is readable by a machine, such as the processor 16a. The processor 16a may be, for example, a microprocessor, microcontroller, or a mainframe or workstation processor. The memory 16c, which stores the Rock Classification software 20, may be, for example, a hard disk, ROM, CD-ROM, DRAM, or other RAM, flash memory, magnetic storage, optical storage, registers, or other volatile and/or non-volatile memory.

Figure 2:
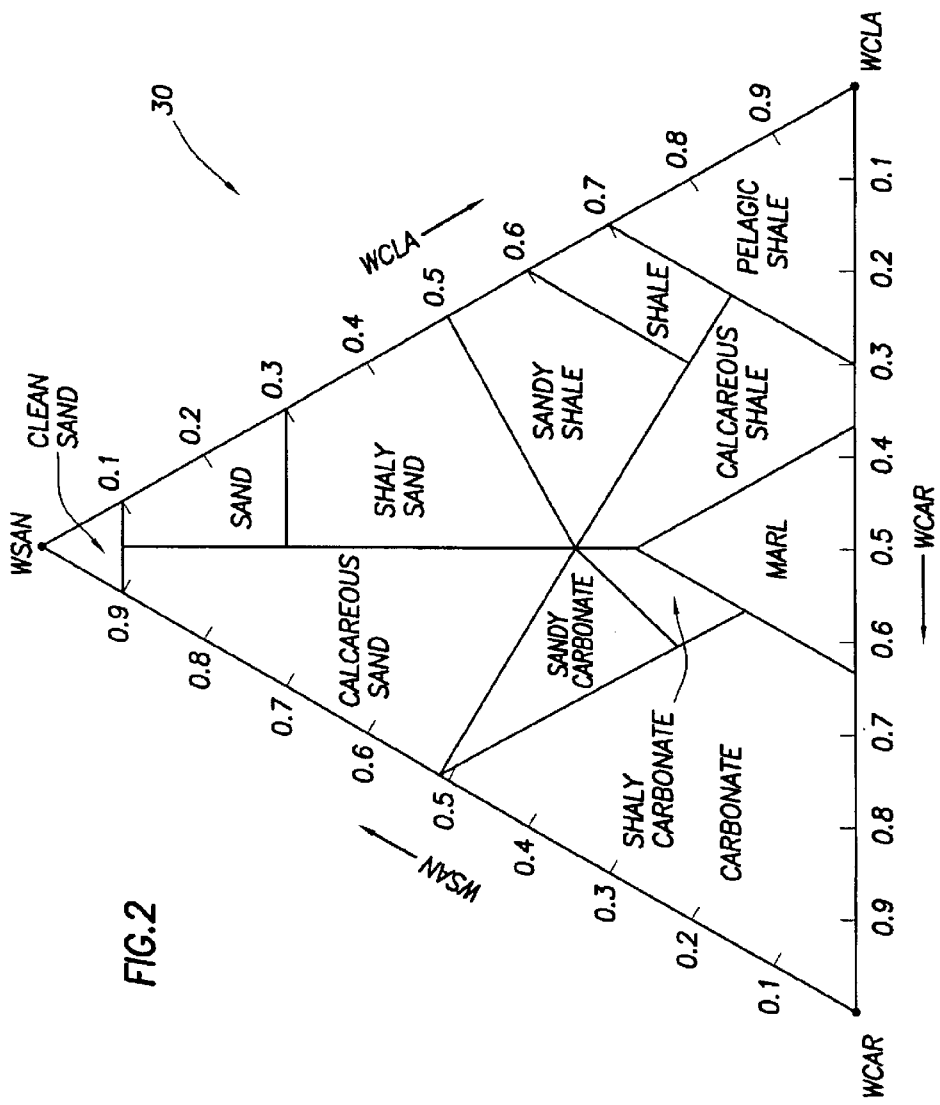
FIG. 2 illustrates the Ternary Diagram Model.

In FIG. 2, a Ternary Diagram Model 30 is illustrated. This model 30 was developed in order to easily characterize each of twelve (12) rock classifications in terms of their percent dry weight of total Carbonate, percent dry weight of total Clay, and percent dry weight of total QFM. The Ternary Diagram Model 30 includes three axes organized in a triangular configuration: (1) the WCAR axis—percent dry weight of total Carbonate, (2) the WSAN axis—the percent dry weight of total QFM, and (3) the WCLA axis—the percent dry weight of total Clay. Each axis begins at zero percent (0.0) and ends with 100 percent (1.0). The Ternary Diagram Model 30 encloses twelve rock classifications, as follows: marl, pelagic shale, shale, sandy shale, shaly sand, sand, clean sand, calcareous sand, calcarcous shale, carbonate, sandy carbonate, and shaly carbonate. Each rock classification in the Ternary Diagram Model 30 has a boundary, and each boundary of each rock classification can be defined by a 'rule', where each 'rule' of each rock classification is further defined in terms of the rock classification's percent dry weight of total Carbonate on the WCAR axis, the rock classification's percent dry weight of total QFM on the WSAN axis, and the rock classification's percent dry weight of total Clay on the WCLA axis. As a result, since there is a 'rule' for each of the twelve (12) rock classifications, there are 'twelve rules' associated with the 'twelve rock classifications' in the Ternary Diagram Model 30. Those 'twelve rules' define a 'rule base' 18, and that 'rule base' 18 (stored in the memory 16c of the computer 16 of FIG. 1) is illustrated in FIG. 3.

Figure 3:
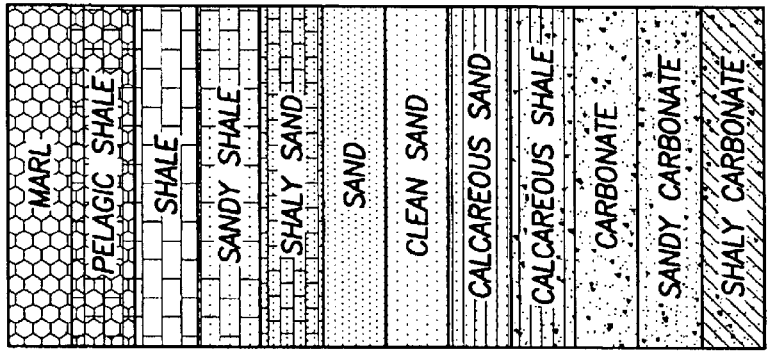
FIG. 3 illustrates the rule base which is generated from the Ternary Diagram Model.

In FIG. 3, the 'rule base' 18 (of FIG. 1) associated with the 'twelve rock classifications' in the Ternary Diagram Model 30 of FIG. 2 is illustrated. The 'rule base' 18 (of FIG. 1) is illustrated in detail in FIG. 3 and is duplicated again below, as follows:

| Rule Base 18* | |
|---|---|
| Rock Classification | Rule |
| (1) marl | 0.35 <= WCLA <= 0.65, 0.35 <= WCAR <= 0.65 |
| (2) pelagic shale | WCLA >= 0.7 |
| (3) shale | 0.6 <= WCLA < 0.7, WSAN >= WCAR |
| (4) sandy shale | 0.5 <= WCLA < 0.6, WSAN >= WCAR |
| (5) shaly sand | 0.5 <= WSAN < 0.7, WCLA >= WCAR |
| (6) sand | 0.7 <= WSAN < 0.9, WCLA >= WCAR |
| (7) clean sand | WSAN >= 0.9 |
| (8) calcareous sand | 0.5 <= WSAN < 0.9, WCAR > WCLA |
| (9) calcareous shale | 0.5 <= WCLA < 0.7, WCAR > WSAN |
| (10) carbonate | WCAR >= 0.5 |
| (11) sandy carbonate | WCAR > WSAN >= WCLA |
| (12) shaly carbonate | WCAR > WCLA > WSAN |

*If any conflict arises between the 'marl' rock classification and any other rock classification, the 'marl' rock classification will control.

The above 'rule base' 18 illustrated in FIG. 3 will be used by the rock classification generation software 20 of FIG. 1 to generate the table 22 of FIG. 1 in response to the output of the ECS sonde 10 (see element numerals 12 and 14 of FIG. 1), the table 22 including the plurality of data points 14 output from the ECS sonde 10 and the corresponding plurality of rock classifications 24 of FIG. 1 (see block 26 of FIG. 1).

A more detailed description of the above referenced 'rule base' 18 will be set forth in the following paragraph.

I. Basics—Determine ECS Facies:
(using WCLA, WSAN, WCAR):
Start at Depth=Input BottomDepth
Step 1:
Look for Salt (WEVA)—Facies 13
Step 2:
Primary Facies Classification:

| | |
|---|---|
| Facies 1: Marl | 0.35 <= WCLA <= 0.65, 0.35 <= WCAR <= 0.65 |
| Facies 2: Pelagic Shale | WCLA >= 0.7 |
| Facies 3: Shale | 0.6 <= WCLA < 0.7, WSAN >= WCAR |
| Facies 4: Sandy Shale | 0.5 <= WCLA < 0.6, WSAN >= WCAR |
| Facies 5: Shaly Sand | 0.5 <= WSAN < 0.7, WCLA >= WCAR |
| Facies 6: Sand | 0.7 <= WSAN < 0.9, WCLA >= WCAR |
| Facies 7: Clean Sand | WSAN >= 0.9 |
| Facies 8: Calcareous Sand | 0.5 <= WSAN < 0.9, WCAR > WCLA |
| Facies 9: Calcareous Shale | 0.5 <= WCLA < 0.7, WCAR > WSAN |
| Facies 10: Carbonate | WCAR >= 0.5 |

If data does not fit any of the above criteria, then:
i. renormalize
ii. try primary classification again.
If data still does not fit any of the above criteria, then use secondary classification:
Secondary Classification:
if WCLA>WSAN>=WCAR call it Sandy Shale (Facies 4)
if WCLA>=WCAR>WSAN call it Calcareous Shale (Facies 9)
if WSAN>=WCLA>=WCAR call it Shaly Sand (Facies 5)
if WSAN>=WCAR>WCLA call it Calcareous Sand (Facies 8)

if WCAR>WSAN>=WCLA call it Sandy Carbonate (Facies 11)

if WCAR>WCLA>WSAN call it Shaly Carbonate (Facies 12)

Figure 4:
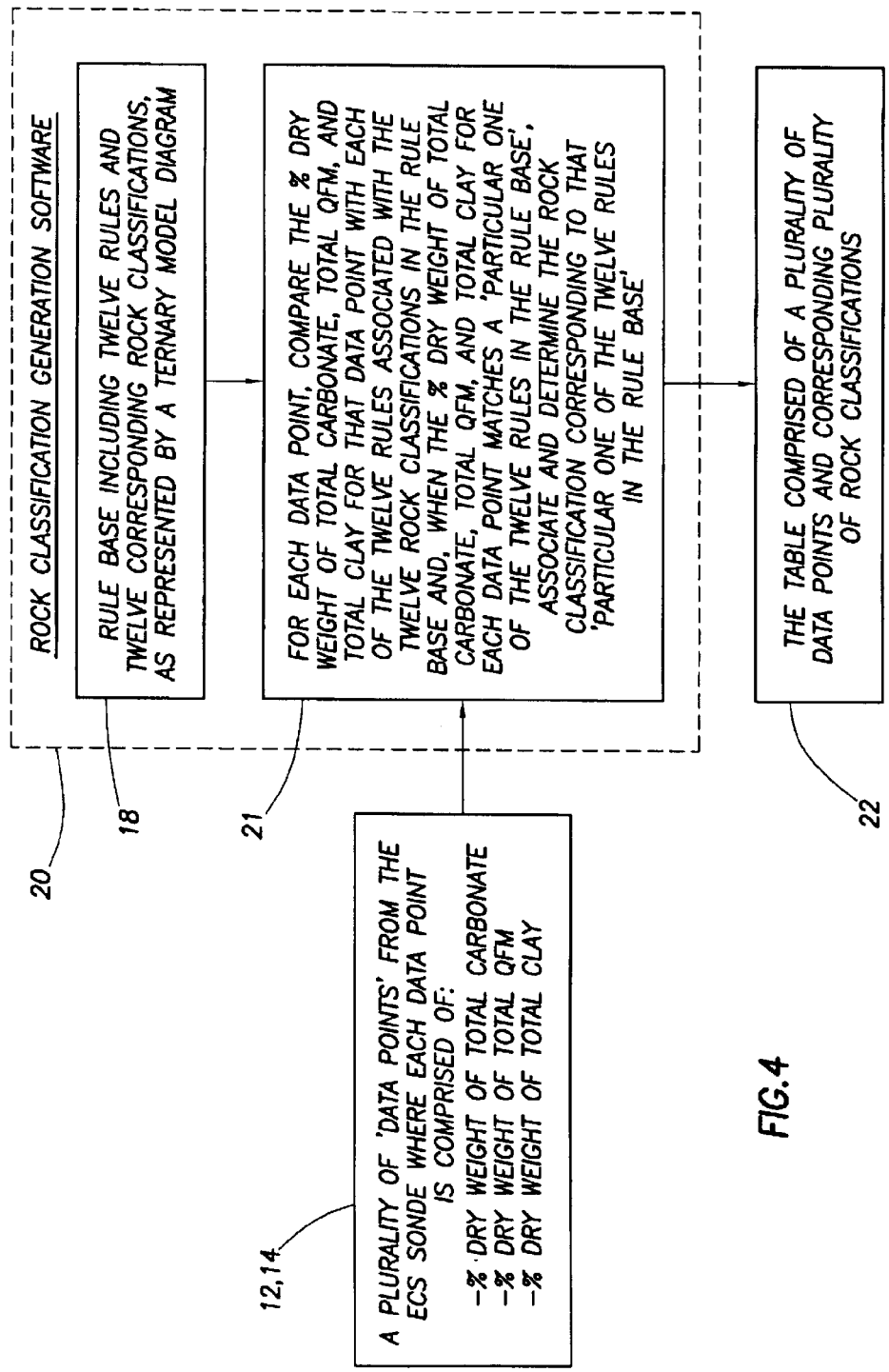
FIG. 4 illustrates a flowchart of the rock classification generation software stored in the memory of the computer system of FIG. 1.

In FIG. 4, a description of the functional operation of the rock classification generation software 20 of FIG. 1 will be set forth in the following paragraph with reference to FIGS. 1 through 4 of the drawings. In FIG. 4, recall from FIG. 1 that the plurality of data points 14 are output from the ECS sonde 10, where each data point includes: a percent dry weight of total Carbonate, a percent dry weight of total QFM, and a percent dry weight of total Clay. Recall also that the 'rule base' 18 of FIG. 3 and duplicated above is stored in the memory 16c of the computer 16 of FIG. 1. In FIG. 4, the rock classification generation software 20 of FIG. 1 will receive the 'plurality of data points' 12–14 output from the ECS sonde 10 of FIG. 1 where each data point includes a percent dry weight of total Carbonate, a percent dry weight of total QFM, and a percent dry weight of total Clay. In addition, the rock classification generation software 20 includes the 'rule base' 18 of FIG. 3 and duplicated above. In block 21 of FIG. 4, in response to the 'plurality of data points' 12/14 and in response to the 'rule base' 18, the rock classification generation software 20 will perform the following function: For each data point, the rock classification generation software 20 will compare the percent dry weight of total Carbonate, total QFM, and total Clay for that data point with each of the twelve rules associated with the twelve rock classifications in the 'rule base' and, when the percent dry weight of total Carbonate, total QFM, and total Clay for each data point matches a 'particular one of the twelve rules in the rule base', the rock classification generation software 20 will associate and determine the rock classification corresponding to that 'particular one of the twelve rules in the rule base' (block 21 of FIG. 4). When a rock classification has been determined for each of the data points which are output from the ECS sonde 10 of FIG. 1, a table 22 of FIG. 1 will be constructed, where the table will include a plurality of data points and a corresponding plurality of rock classifications which correspond, respectively, to the plurality of data points. When that table 22 is constructed, the table 22 can be generated as an output from the recorder or display device 16b of FIG. 1; in addition, that table 22 will be stored in the memory 16c of the computer system 16 of FIG. 1. See the table 22 and 26 of FIG. 1. For example, assume a 'particular data point' has a 'particular percent dry weight of total Carbonate and total QFM and total Clay'; in FIG. 3, locate the rule base 18 and attempt to match each of the twelve rules in the rule base 18 with the 'particular percent dry weight of total Carbonate and total QFM and total Clay' of the 'particular data point'. If (by way of example) the percent dry weight of total Carbonate and total QFM and total Clay of the 'particular data point' matches the rule 'WSAN>=0.9' appearing in the second column of FIG. 3, then we know that the rock classification associated with the 'particular data point' is 'Clean Sand', since the 'rule' in the 'rule base' associated with 'Clean Sand' is 'WSAN>=0.9'.

Referring to FIGS. 5 through 17, a second rock classification method and apparatus, representing a second rock classification system, is illustrated. The second rock classification system was developed to merge the data obtained from two kinds of borehole measurement devices (i.e., the Elemental Capture Spectroscopy Sonde and the Oil Based Mud Imaging Sonde) and to use the rock classification system of the first rock classification system in order to provide a second resulting output that will improve subsurface geological interpretation including reservoir characterization. The second resulting output of this second rock classification system is a well log representing a refined rock classification system called the 'Refined Lithofacies' log or the 'iCore lithofacies' log or the 'iCore rock classification' log.

Figure 5:
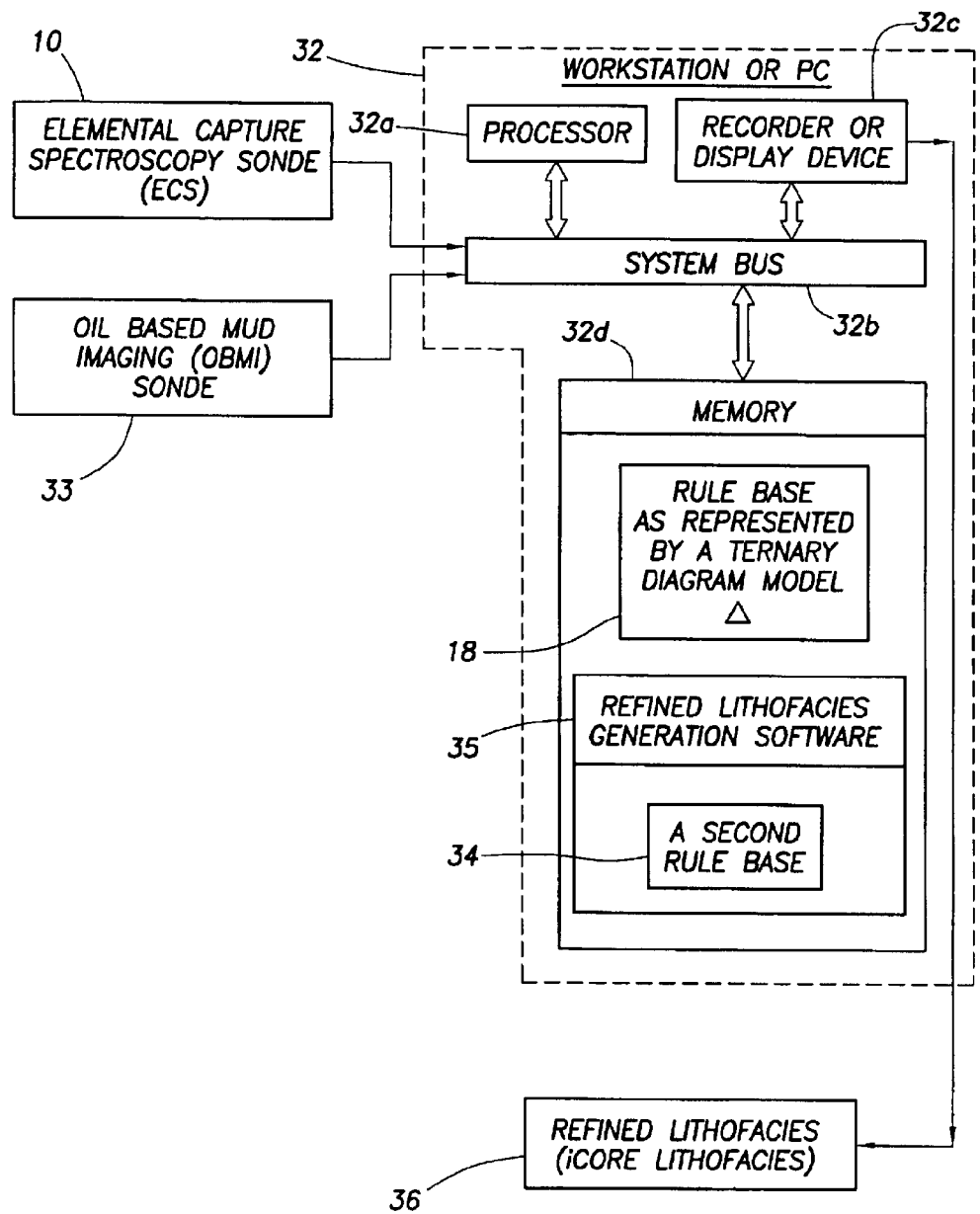
FIG. 5 illustrates a computer system which stores the Ternary Diagram Model and a second rule base which generates a 'Refined Lithofacies' output log (also known as the 'iCore lithofacies' output log) in response to an output from the Oil Based Mud Imaging (OBMI) tool.

In FIG. 5, a workstation or personal computer or other computer system 32 includes a processor 32a operatively connected to a system bus 32b, a recorder or display device 32c operatively connected to the system bus 32b, and a memory 32d operatively connected to the system bus 32b. The memory 32d stores the 'rule base' 18 of FIG. 3 as represented by the Ternary Model Diagram 30 of FIG. 2, and a Refined Lithofacies Generation Software 35 which includes a 'second rule base' 34. The computer system 32 is responsive to an output from a logging tool called the "Oil Based Mud Imaging (OBMI) Sonde" 33 (hereinafter called the 'OBMI tool 33') which is owned and operated by Schlumberger Technology Corporation of Houston, Tex. The computer system 32 is also responsive to the output from the Elemental Capture Spectroscopy (ECS) Sonde 10 (from FIG. 1) which includes the plurality of data points, each data point of the plurality of data points including: the percent dry weight of total Carbonate, the percent dry weight of total QFM, and the percent dry weight of total Clay. The ECS Sonde 10 is owned and operated by Schlumberger Technology Corporation of Houston, Tex. Ultimately, the recorder or display device 32c will generate an output log, in accordance with another aspect of the present invention, known as a 'Refined Lithofacies' log 36 (or Refined Rock Classification log 36), also known as the 'iCore Lithofacies' log 36 (or 'iCore Rock Classification' log 36). The OBMI tool 33, the 'second rule base' 34, and the 'Refined lithofacies' output log 36 will be discussed in greater detail in the paragraphs to follow. In FIG. 5, the computer system 32 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The memory 32d is a computer readable medium or a program storage device which is readable by a machine, such as the processor 32a. The processor 32a may be, for example, a microprocessor, microcontroller, or a mainframe or workstation processor. The memory 32d, which stores the Refined Lithofacies Generation software 35, may be, for example, a hard disk, ROM, CD-ROM, DRAM, or other RAM, flash memory, magnetic storage, optical storage, registers, or other volatile and/or non-volatile memory.

Figures 6, 7:
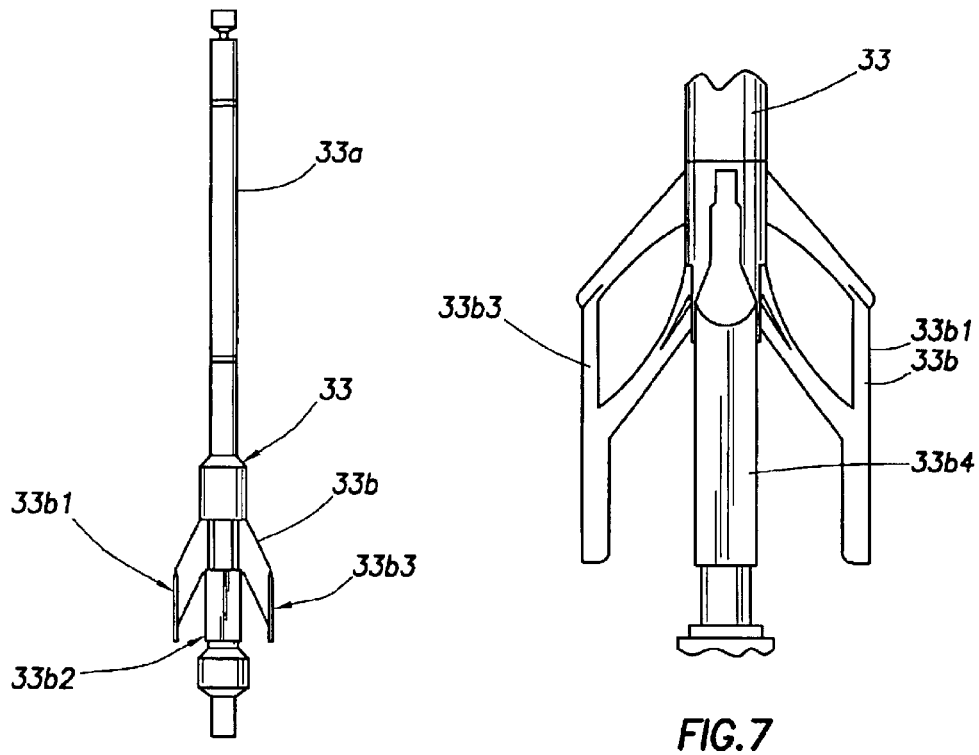
FIGS. 6–10 illustrate views of the OBMI tool and its output log.
Figure 8:
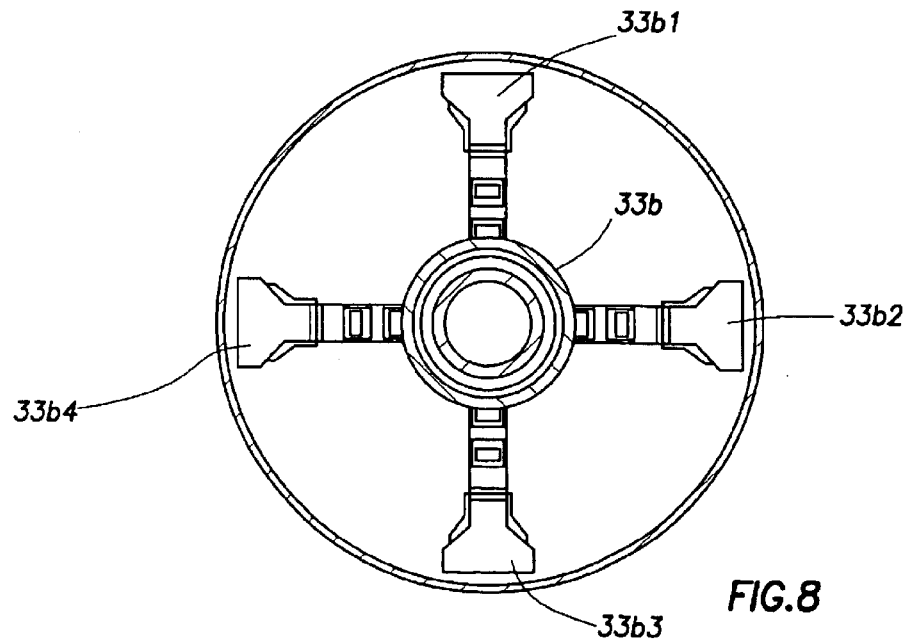

In FIGS. 6 through 10, a description of the Oil Based Mud Imaging (OBMI) tool 33 of FIG. 5 will be provided below with reference to FIGS. 6 through 10. In FIG. 6, the OBMI tool 33 includes a tool body 33a and a pad section 33b, the pad section 33b including four pads, pad 33b1, pad 33b2, and pad 33b3 (shown in FIG. 6), and pad 33b4 (not shown in FIG. 6). The four pads 33b1–33b4 are adapted to be extended transversely in the wellbore to a point where each of the pads 33b1–33b4 will actually touch the sides of the wellbore wall (best seen in FIG. 9). Actually, each pad 33b1–33b4 includes five button pairs, where each button pair generates a resistivity curve when the pads 33b1–33b4 touch the sides of the wellbore wall and the OBMI tool 33 is pulled upwardly in the wellbore. In FIG. 7, a better view of the pad section 33b is illustrated, the pads 33b1–33b4 being extended radially outward in order that the pads 33b1–33b4 will each touch the internal wall of the wellbore. In FIG. 8, a top view of the OBMI tool 33 of FIG. 7 including the pad section 33b of FIG. 7 is illustrated. In FIG.

Figure 10:
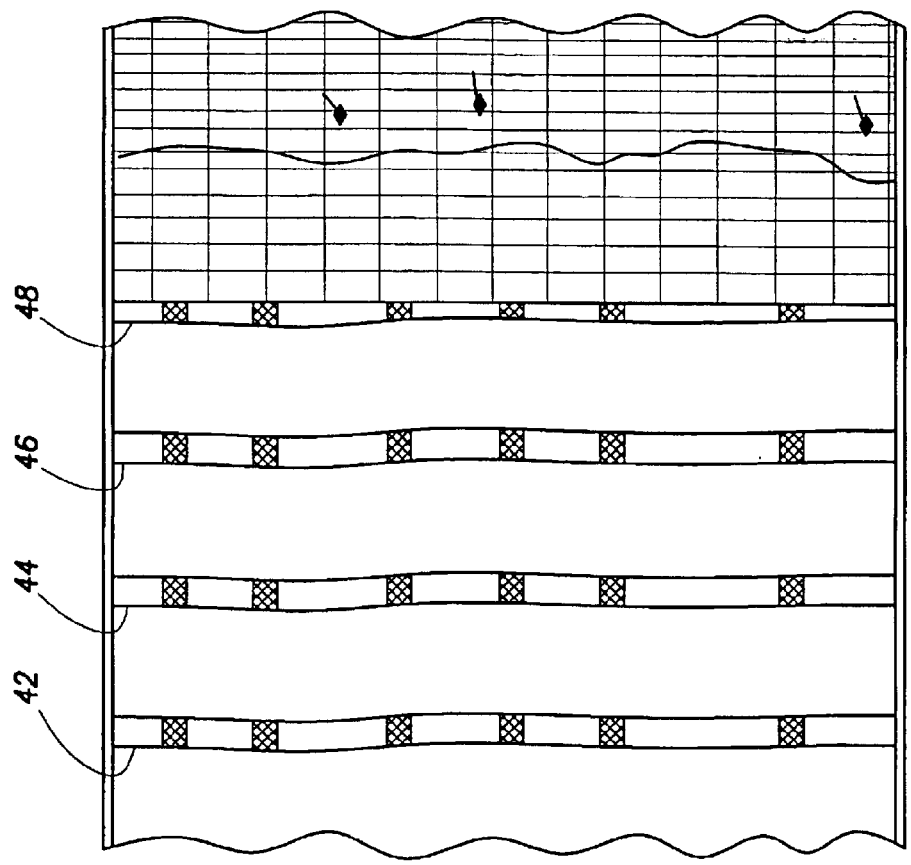
Figure 9:
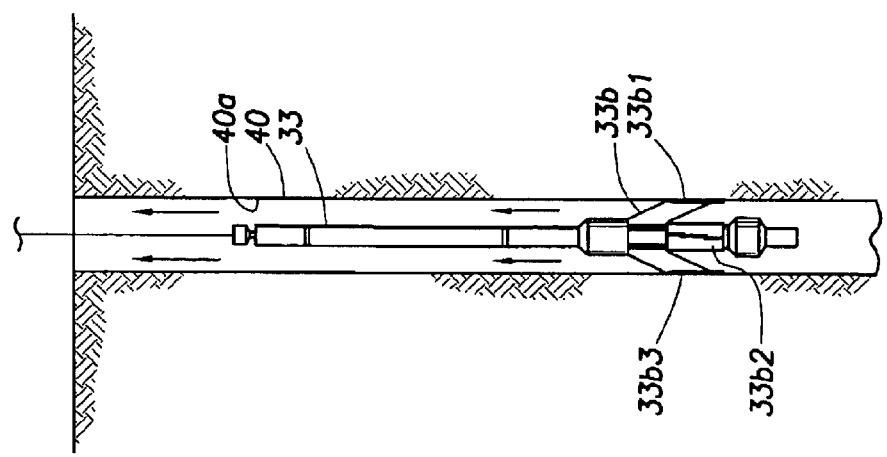

8, the four pads 33b1, 33b2, 33b3, and 33b4 of the OBMI tool 33 are illustrated in their entended position, that is, their position when the pads 33b1–33b4 are extended radially outward to a position whereby the pads 33b1–33b4 actually touch the internal wall of the wellbore. In FIG. 9, the OBMI tool 33 is shown disposed in a wellbore 40. The pads 33b1–33b4 are shown in their extended position, extending radially outward to touch the internal wall 40a of the wellbore 40. In this position, the OBMI tool 33 is pulled upwardly toward the surface of the wellbore. During the pull upwardly, the pads 33b–33b4 of the OMBI tool 33, which are touching the internal wall 40a of the wellbore 40, will move along the wall 40a of the wellbore 40 in response to the pull of the OMBI tool 33 upwardly toward the surface, the five button pairs on each pad 33b1–33b4 generating and recording five resistivity curves. The five resistivity curves generated and recorded for each pad 33b1–33b4 will hereinafter be called a 'track'. Since there are four pads 33b1–33b4 on the OMBI tool 33, four 'tracks' will be generated by the OMBI tool 33, one 'track' for each pad of the OMBI tool 33. In FIG. 10, four 'tracks' are illustrated, that is, 'track' 42 is associated with pad 33b1, 'track' 44 is associated with pad 33b2, 'track' 46 is associated with pad 33b3, and 'track' 48 is associated with pad 33b4 of the pad section 33b of the OBMI tool 33.

Figure 11:
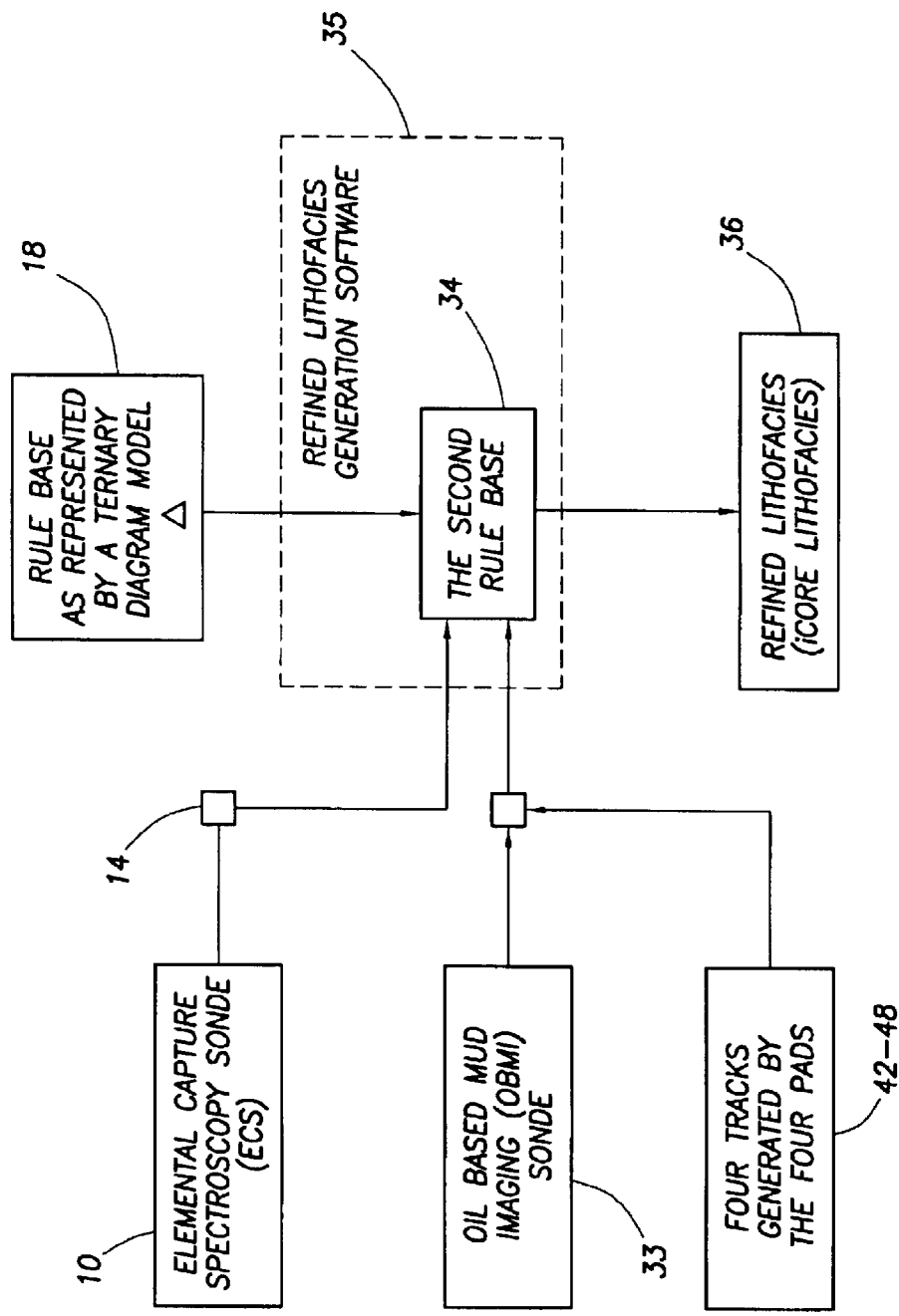
FIG. 11 illustrates a block diagram depicting the function of the second rule base stored in the computer system of FIG. 5.

In FIG. 11, a construction of the Refined Lithofacies Generation Software 35 of FIG. 5 is illustrated. Recall that the output of the OMBI tool 33 includes the four tracks 42, 44, 46, and 48 of FIG. 10. Recall again from FIGS. 1 and 5 that the output 14 of the ECS sonde 10 includes a plurality of data points where each data point is comprised of: a percent dry weight of total Carbonate, a percent dry weight of total QFM, and a percent dry weight of total Clay. The Refined Lithofacies Generation Software 35 includes a 'second rule base' 34. The 'second rule base' 34 receives the four tracks 42, 44, 46, 48 from the OMBI tool 33 and the output from the ECS sonde 10 (which includes a percent dry weight of total Carbonate, a percent dry weight of total QFM, and a percent dry weight of total Clay) and the 'rule base' 18 as represented by the Temary Model Diagram 30 of FIG. 2. In response to the four tracks 42, 44, 46, 48 and the output from the ECS sonde 10 and the 'rule base' 18, the 'second rule base' 34 will generate the Refined Lithofacies log 36, also known as the 'iCore lithofacies' log 36 and the 'Refined Rock Classification' log 36 in FIG. 11.

Figure 12A:
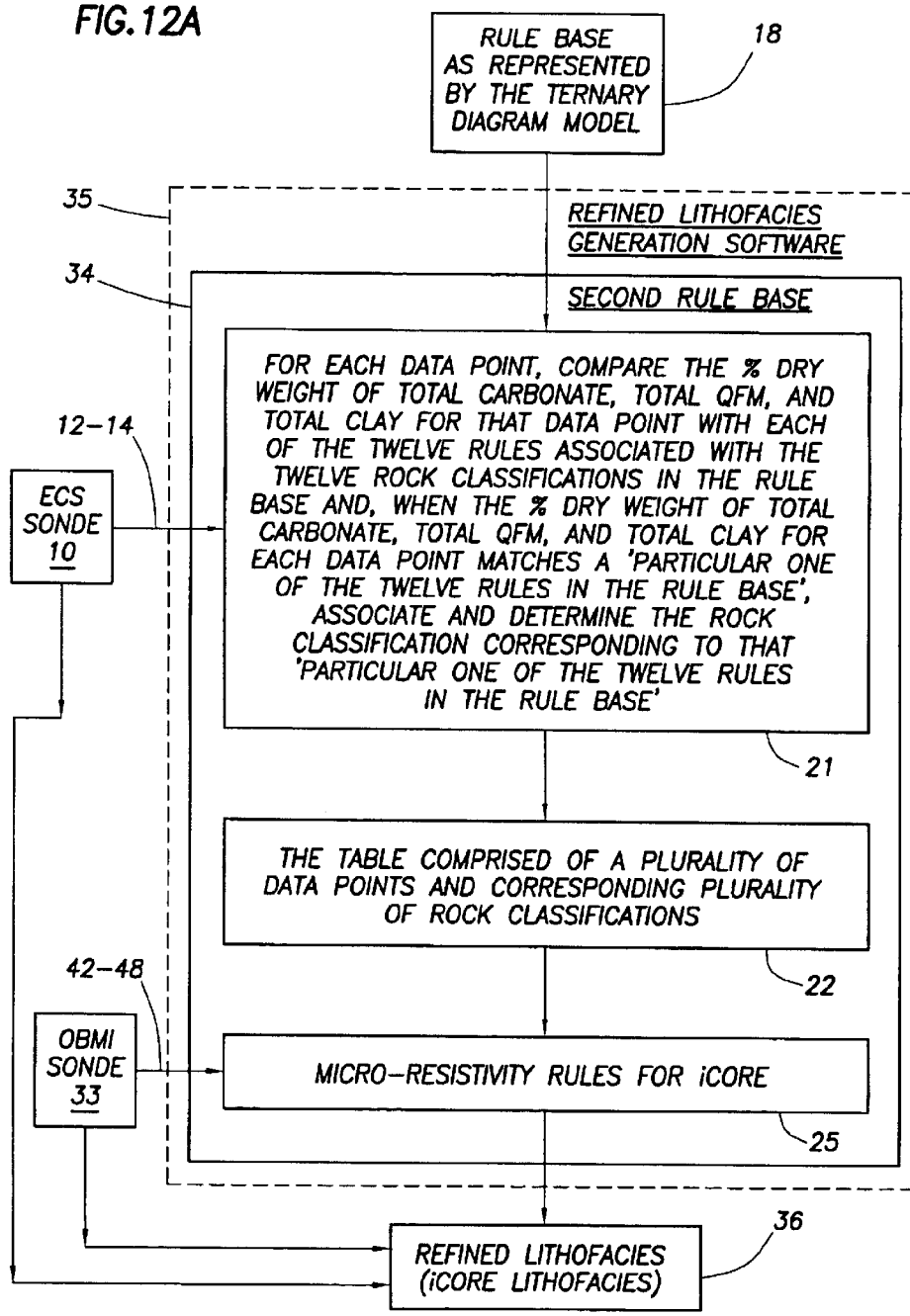

In FIG. 12A, a detailed construction of the 'second rule base' 34 of FIGS. 5 and 11 is illustrated. The Refined Lithofacies Generation Software 35 includes the 'second rule base' 34, and the 'second rule base' 34 includes a block 21 (the same as block 21 of FIG. 4), block 21 receiving the plurality of data points output from the ECS sonde 10 and the rule base (as represented by the Ternary Diagram Model 30) 18. In FIG. 12A, the ECS sonde 10 also provides its output (including the plurality of data points) to the Refined Lithofacies block 36, which generates the Refined Lithofacies log 36 of FIG. 13, for the purpose of including the 'output from the ECS sonde 10 comprised of the percent dry weight of total carbonate and the percent dry weight of total QFM and the percent dry weight of total clay' 36a on the 'Refined Lithofacies' log 36 of FIG. 13 (to be discussed later in this specification). In block 21 of FIG. 12A, in response to the 'plurality of data points' 12–14 and in response to the 'rule base' 18, the 'second rule base' 34 of the Refined Lithofacies Generation Software 35 will perform the following function: For each data point, the Refined Lithofacics Generation Software 35 will compare the percent dry weight of total Carbonate, total QFM, and total Clay for that data point with each of the twelve rules associated with the twelve rock classifications in the 'rule base' and, when the percent dry weight of total Carbonate, total QFM, and total Clay for each data point matches a 'particular one of the twelve rules in the rule base', the Refined Lithofacies Generation Software 35 will associate and determine the rock classification corresponding to that 'particular one of the twelve rules in the rule base' (block 21 of FIG. 12A). When a rock classification has been determined for each of the data points which are output from the ECS sonde 10 of FIG. 12A, a rock classification table 22 will be constructed, where the rock classification table 22 will include a plurality of data points and a corresponding plurality of rock classifications which correspond, respectively, to the plurality of data points. A set of 'micro-resistivity rules for iCore' 25 will receive two inputs: (1) a first input including an output (comprising the four tracks 42, 44, 46, 48) which is being generated from the OBMI sonde 33, and (2) a second input including the rock classification table 22 in FIG. 12A. The OBMI sonde 33 also provides its output (including the four tracks 42–48) to the Refined Lithofacies block 36, which generates the Refined Lithofacies log 36 of FIG. 13, for the purpose of including the 'four tracks (42–48)' 36d on the 'Refined Lithofacies' log 36 of FIG. 13 (to be discussed later in this specification). In response to the rock classification table 22 and the four tracks from the OBMI sonde 33, the 'micro-resistivity rules for iCore' 25 in FIG. 12A will generate the 'actual Refined Lithofacies log' 36c for the purpose of including the 'actual Refined Lithofacies log' 36c on the 'Refined Lithofacies' log 36 of FIG. 13 (to be discussed later in this specification).

In FIG. 12B, a detailed construction of the 'micro-resistivity rules for iCore' block 25 of FIG. 12A is illustrated. The 'micro-resistivity rules for iCore' 25 consist of a set of rules designed for generating the 'actual Refined Lithofacies' log 36c portion of the 'Refined Lithofacies' log 36 of FIG. 13 in response to two inputs: (1) the output from the OBMI sonde 33 which include the four tracks 42, 44, 46, 48 where each track 42–48 includes five resistivity data curves as a function of depth in the wellbore, and (2) the rock classification table 22 of FIG. 12A including a plurality of rock classifications corresponding to a plurality of data points as a function of depth in the wellbore. The 'micro-resistivity rules for iCore' 25 are illustrated in FIG. 12B and are duplicated again below as follows:

Micro-resistivity Rules for iCore (Item 1) Filter spectroscopy Ternary Model Diagram 30 outputs for relevant bed thickness. Filter micro-resistivity data for data quality and noise.

(Item 2) Based on comparison to input micro-resistivity cutoff value, classify micro-resistivity as high or low.

(Item 3) If the spectroscopy Ternary Model Diagram 30 facies is one of the following:

Clean Sand

Sand

Shaly Sand

Calcareous Sand

Carbonate and the resistivity value (received from the output of the OBMI sonde 33) is classified as low, then, at that depth interval, shale bedding overrides.

(Item 4) If the spectroscopy Ternary Model Diagram 30 facies is one of the following:

Pelagic Shale

Shale

Sandy Shale
Calcareous Shale
and the resistivity value (received from the output of the OBMI sonde 33) is classified as high, then, at that depth interval, sand bedding overrides.

Figure 13:
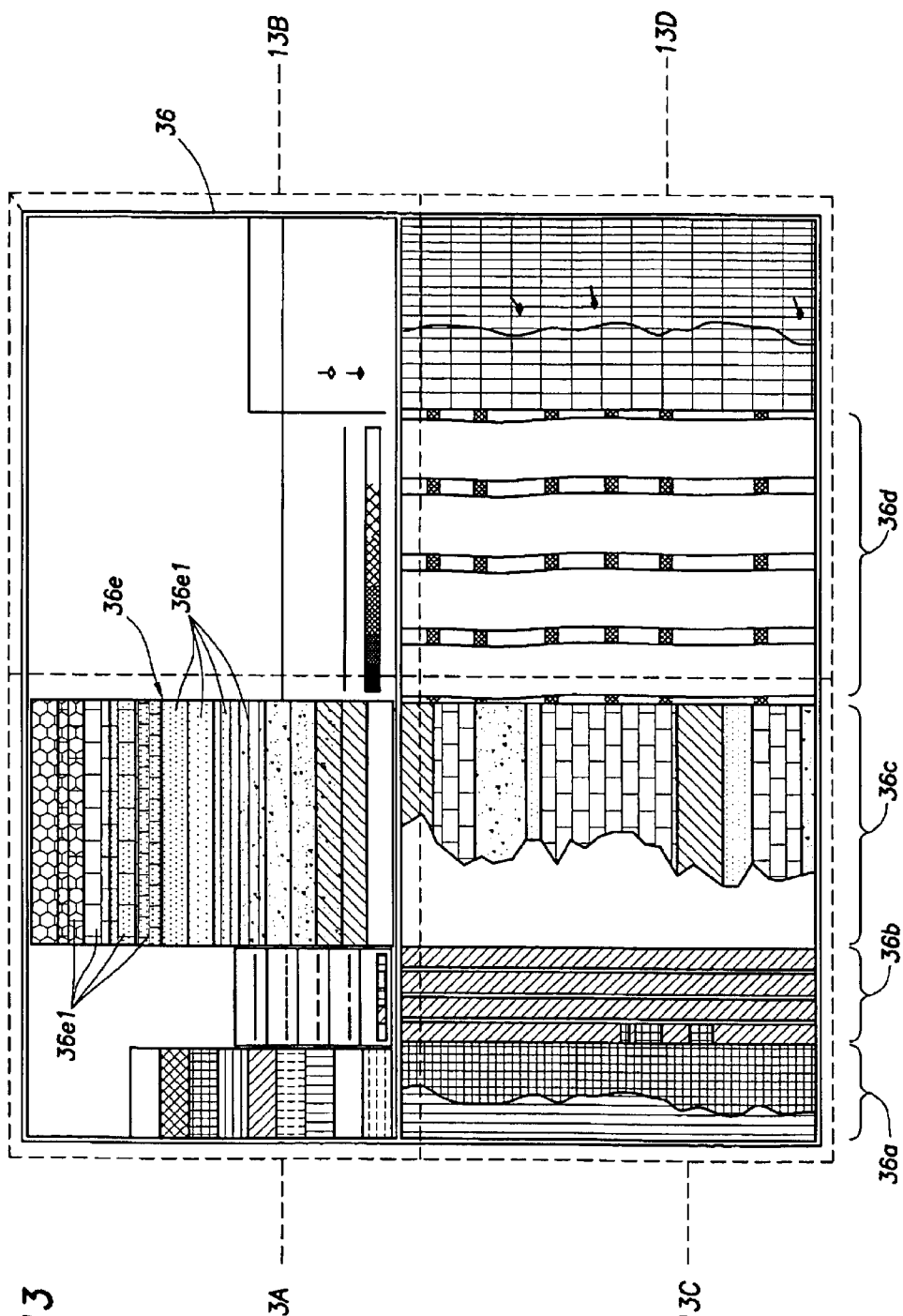
FIGS. 13, 13A, 13B, 13C and 13D illustrate one view of the 'Refined Lithofacies' output log, in accordance with one aspect of the present invention, which is generated by the computer system of FIG. 5.
Figure 13A:
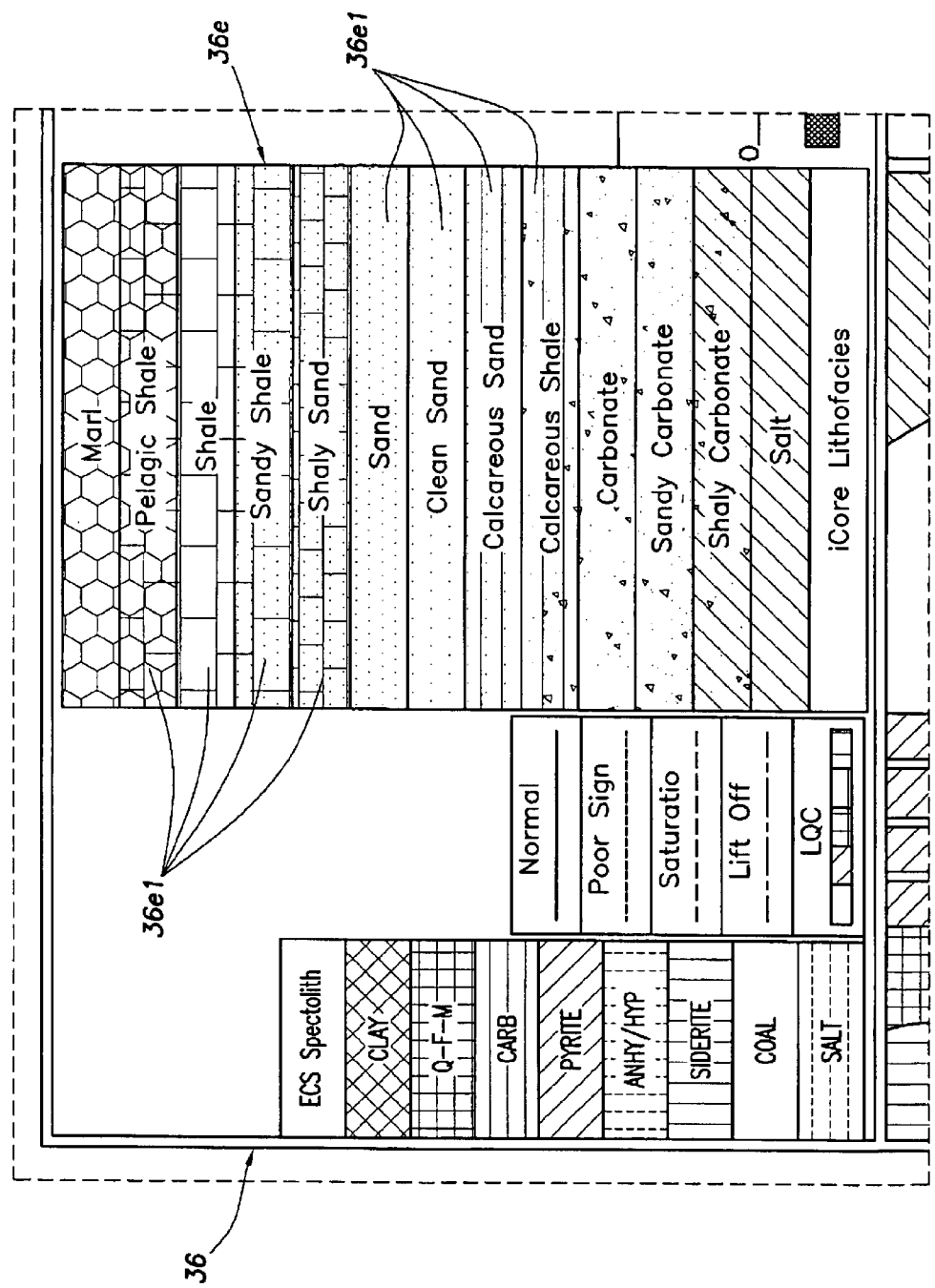
Figure 13B:
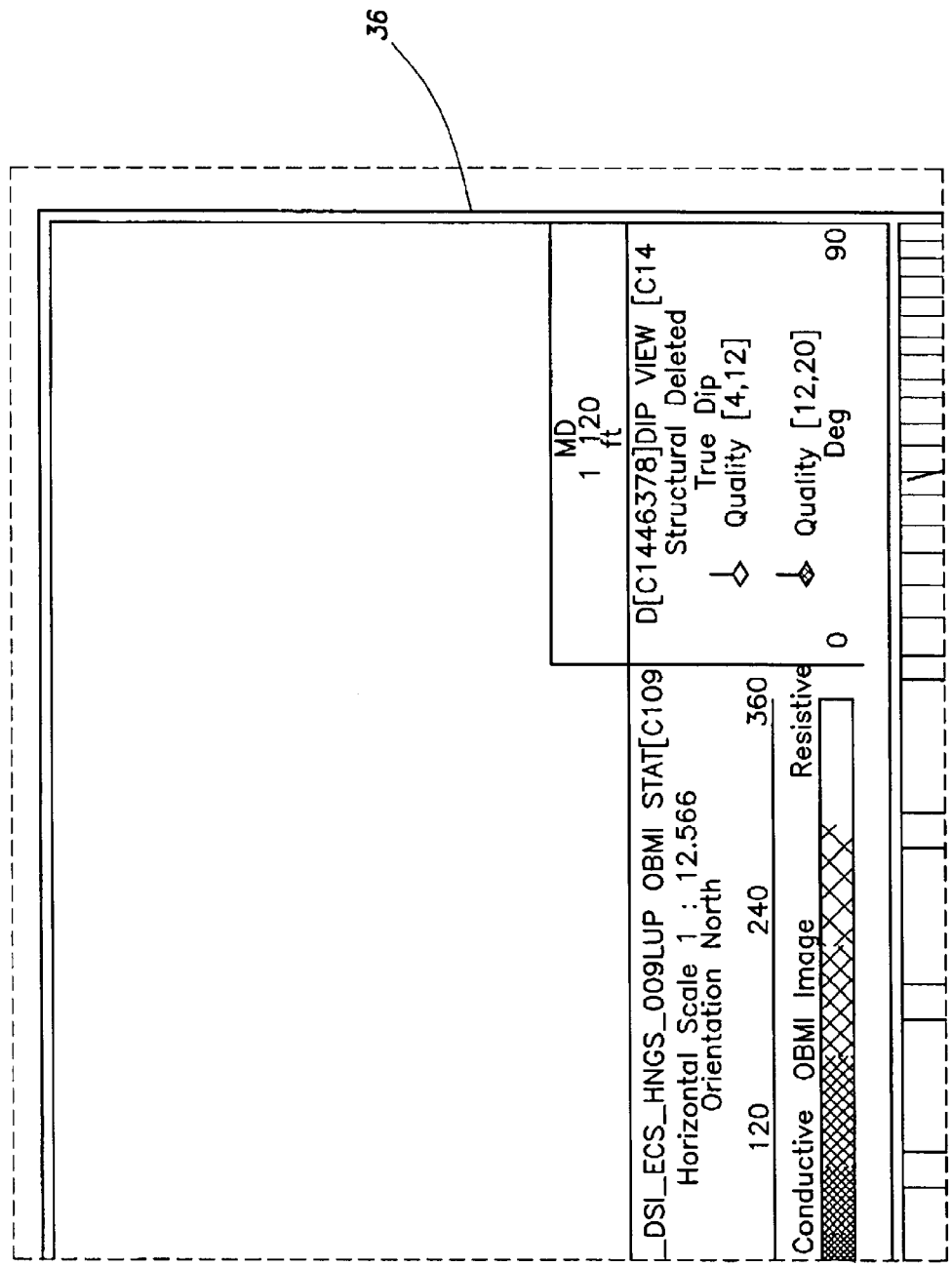
Figure 13C:
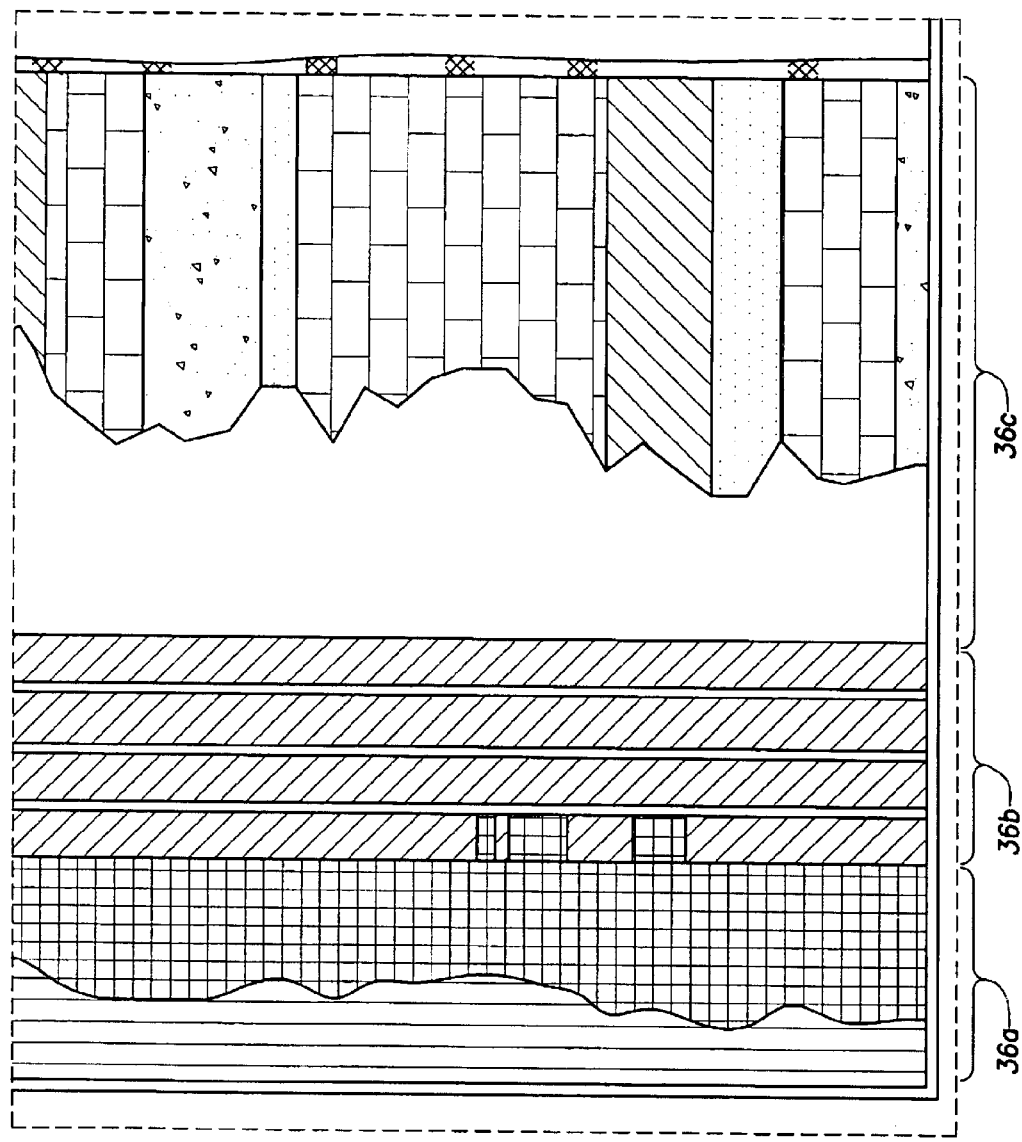
Figure 13D:
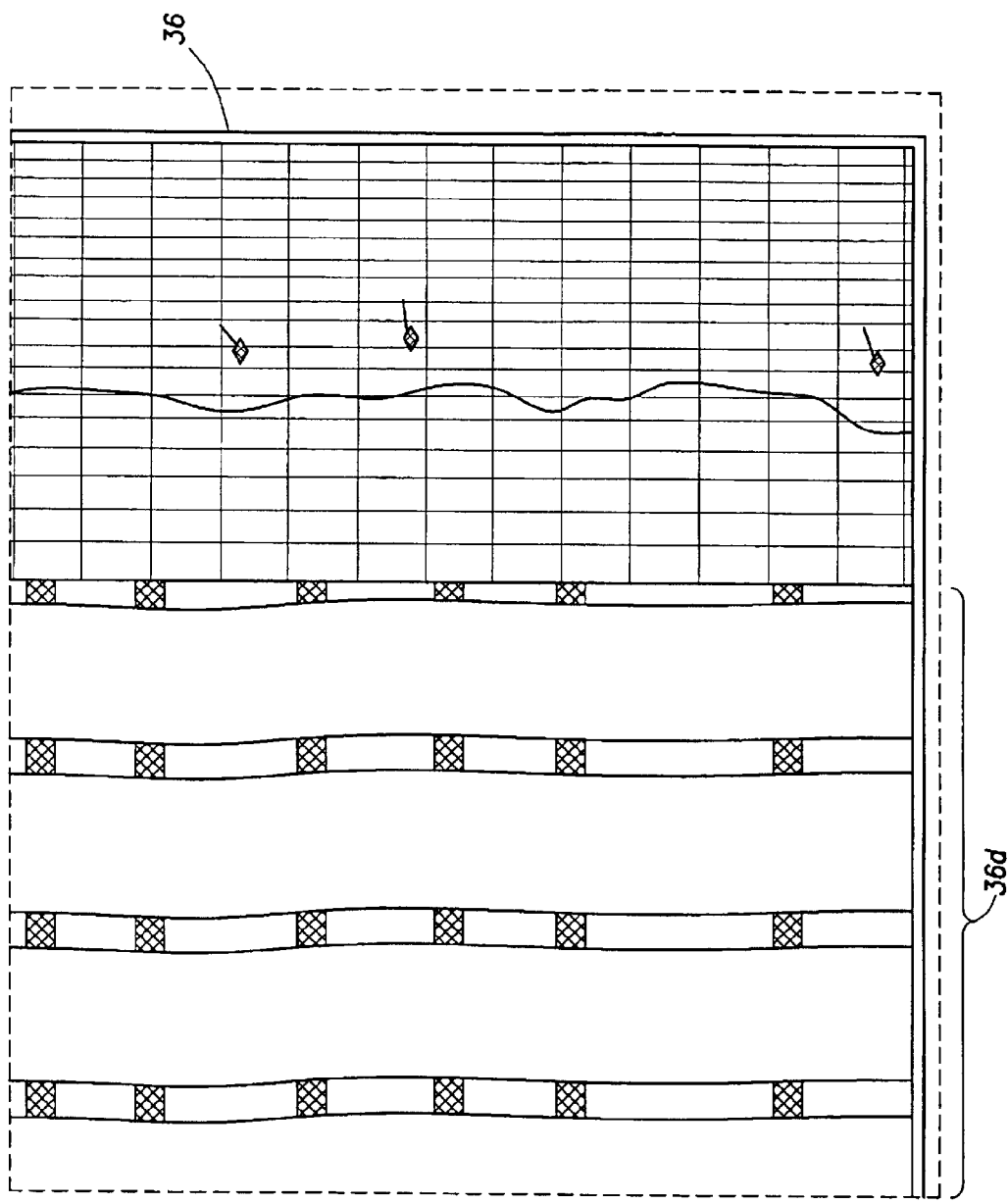
Figure 14:
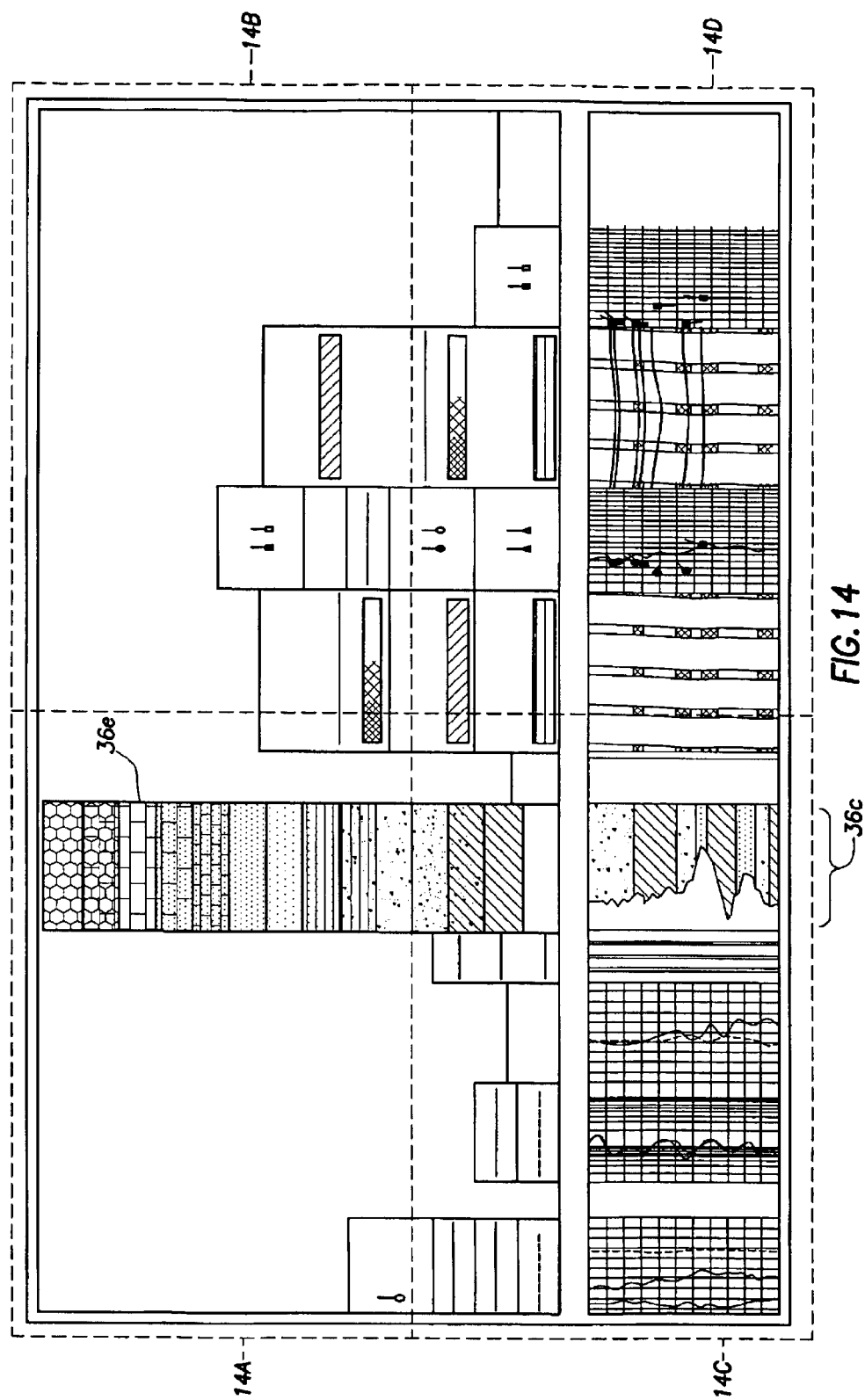
Figure 14A:
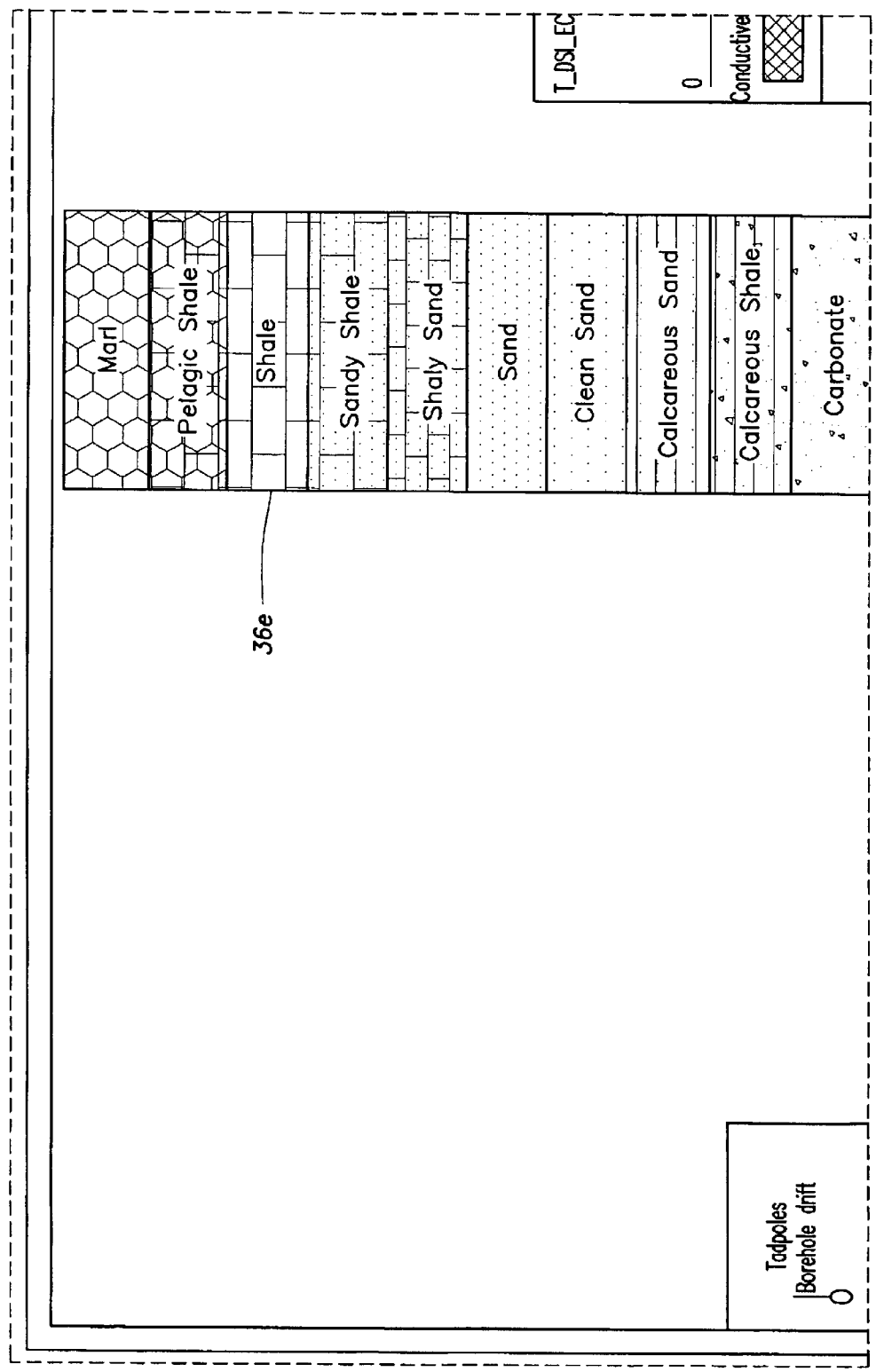
Figure 14B:
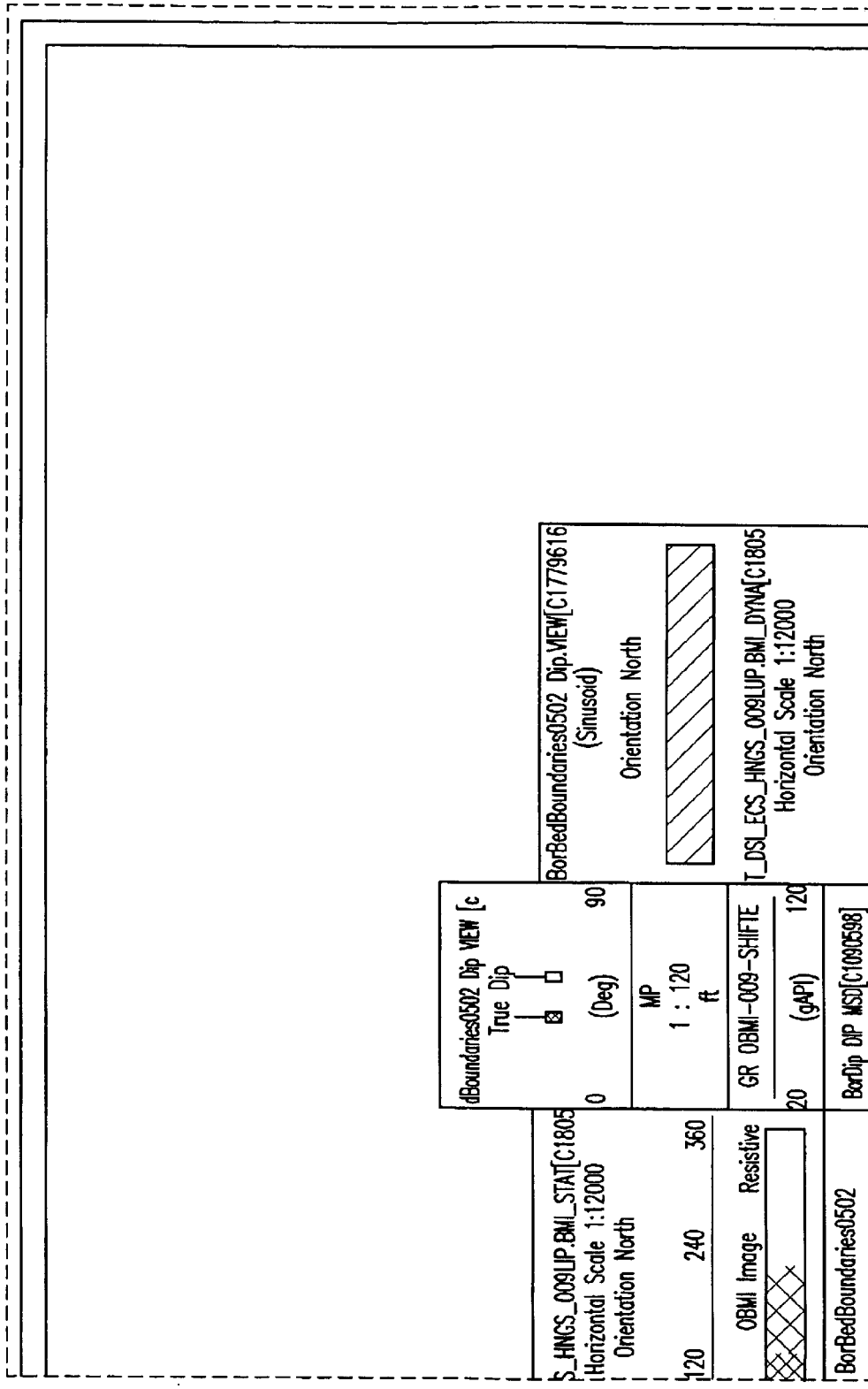
Figure 14C:
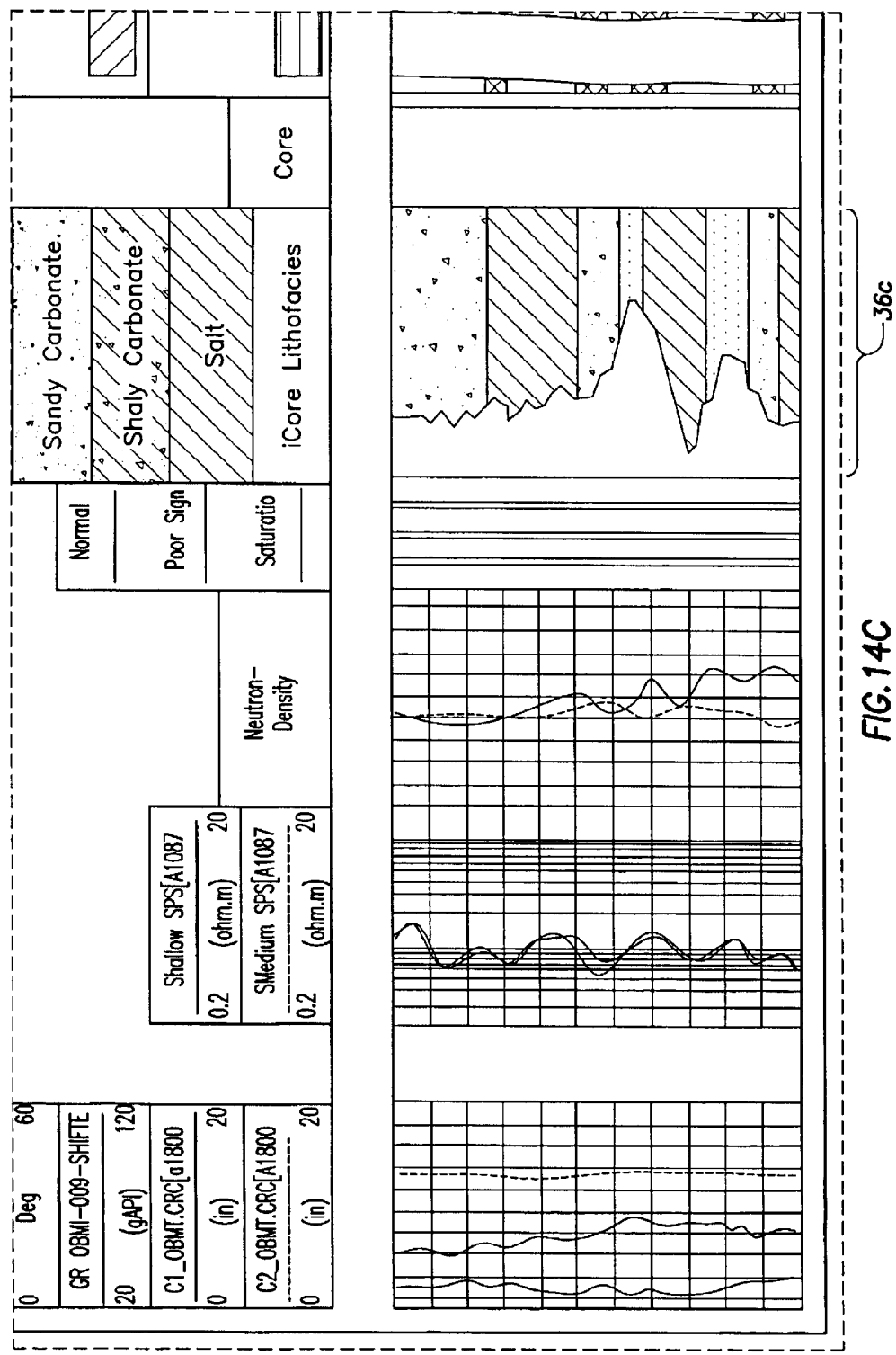
Figure 14D:
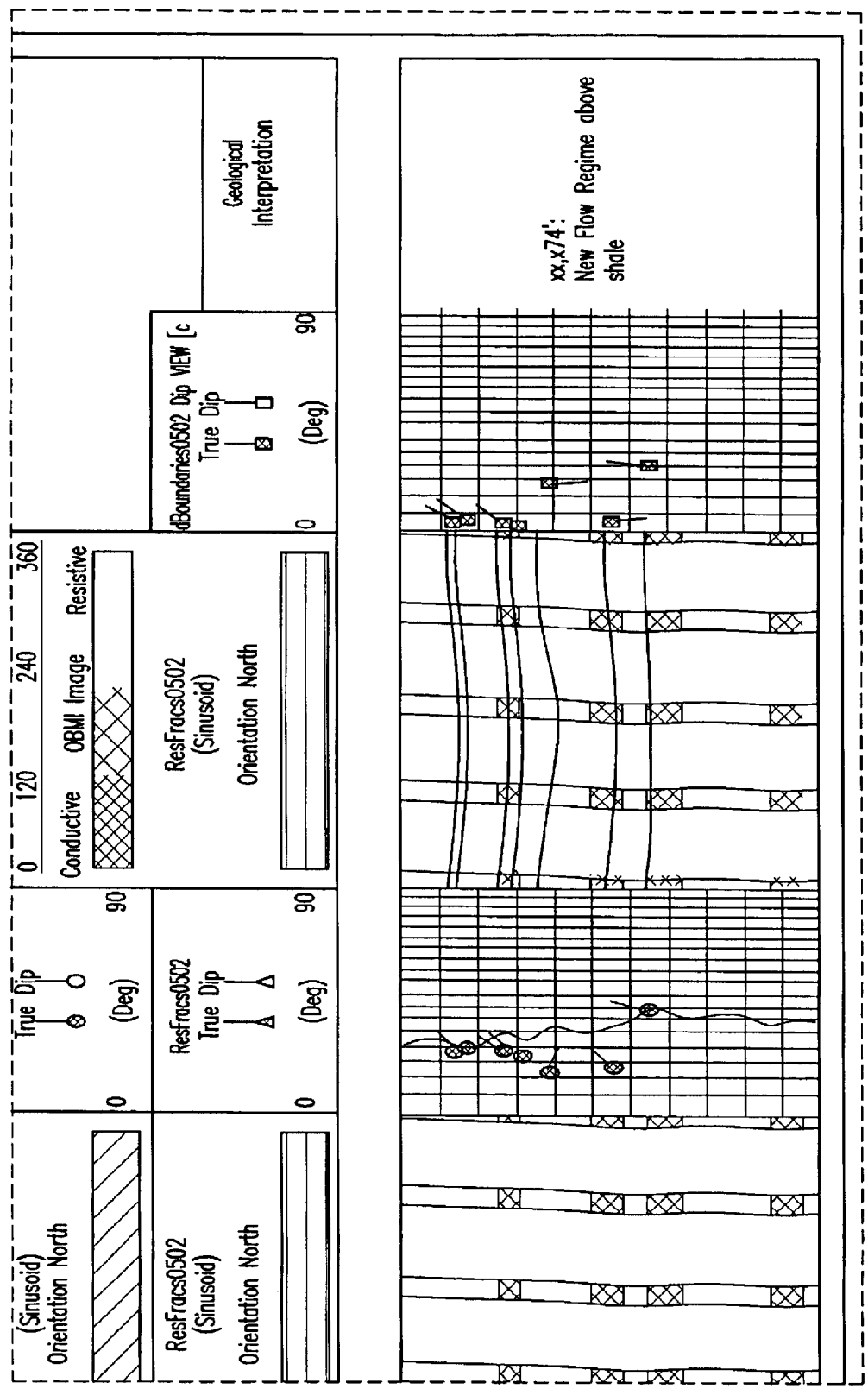
Figure 15:
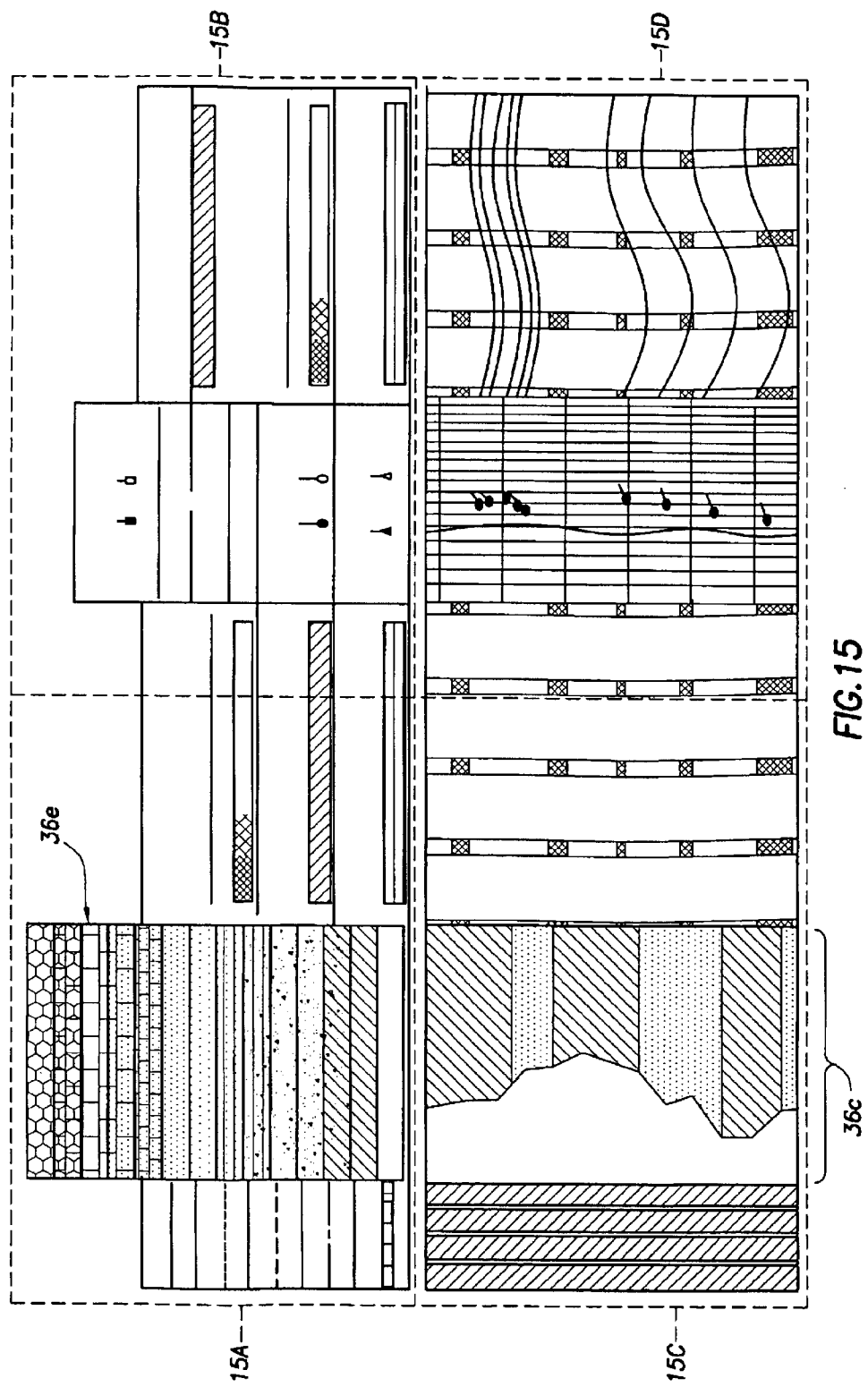
Figure 15A:
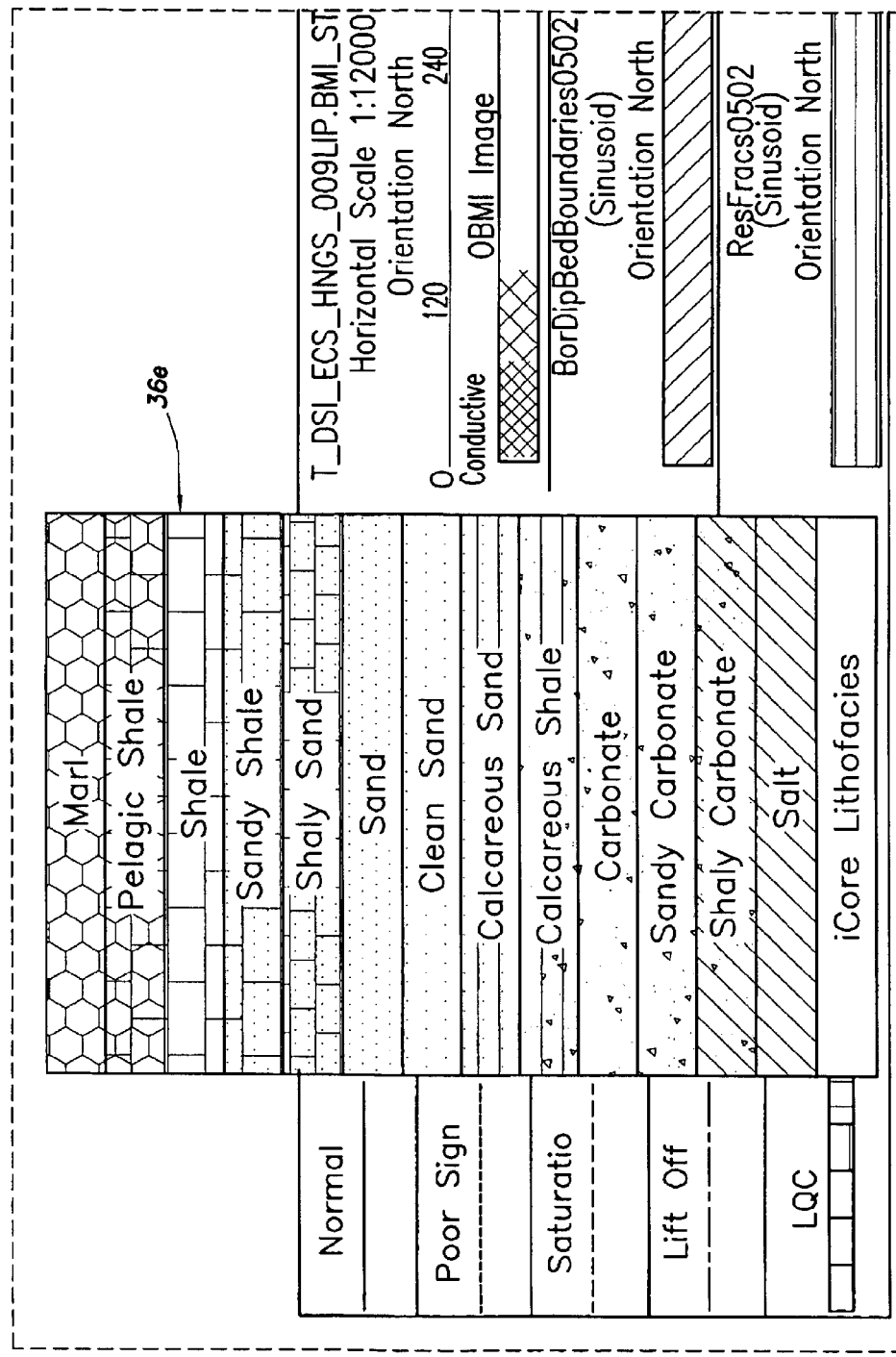
Figure 15B:
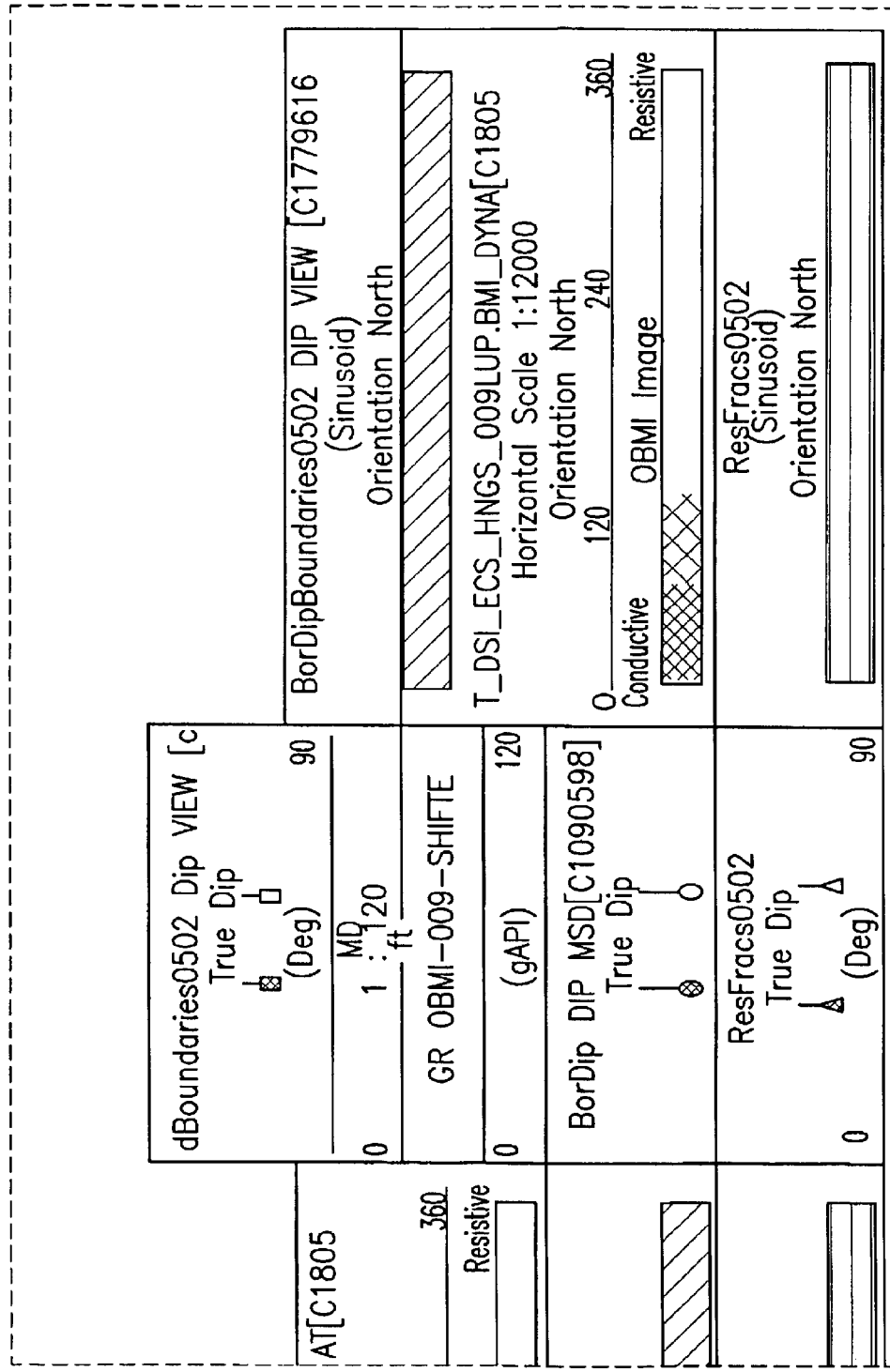
Figure 15C:
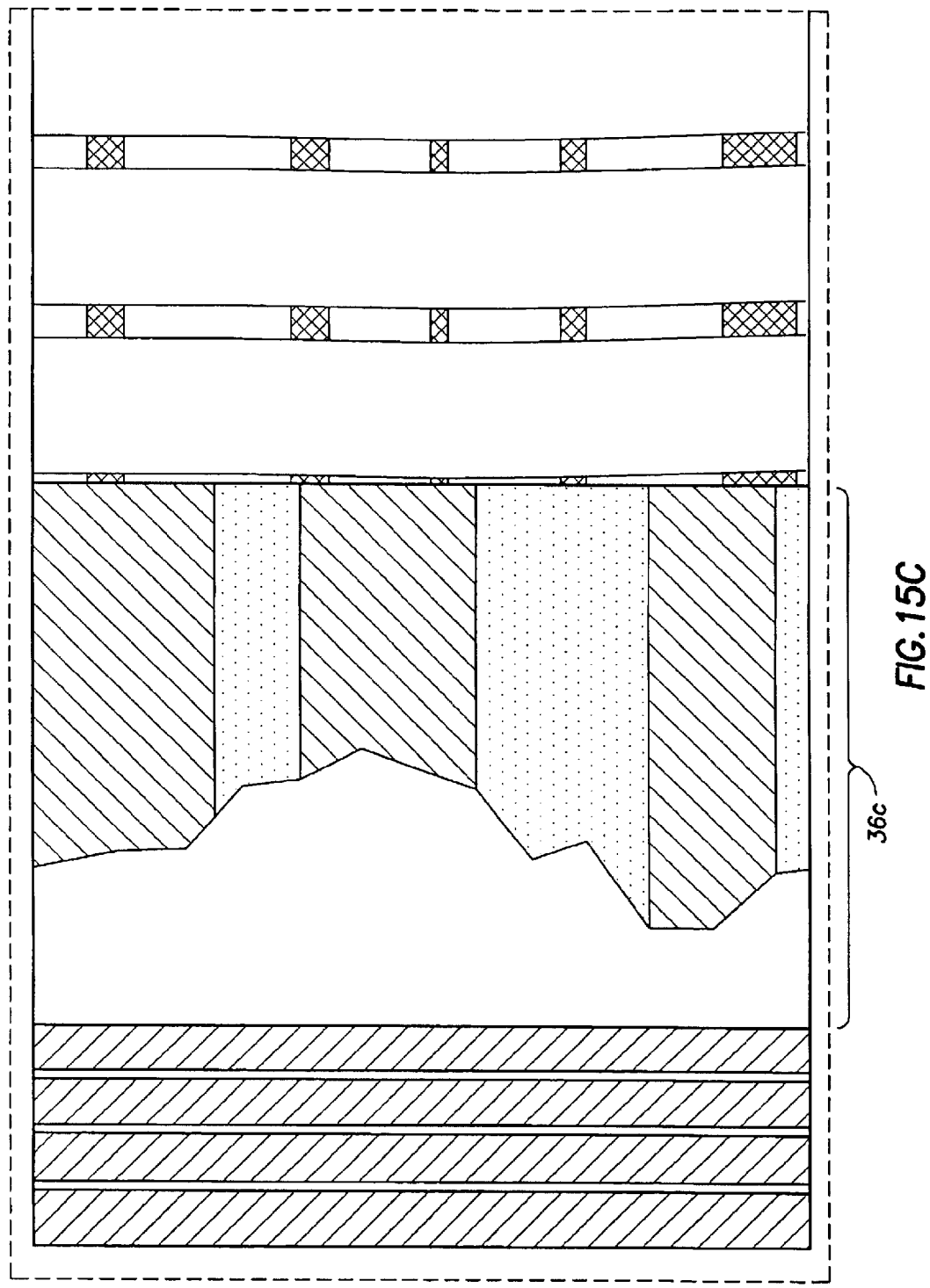
Figure 15D:
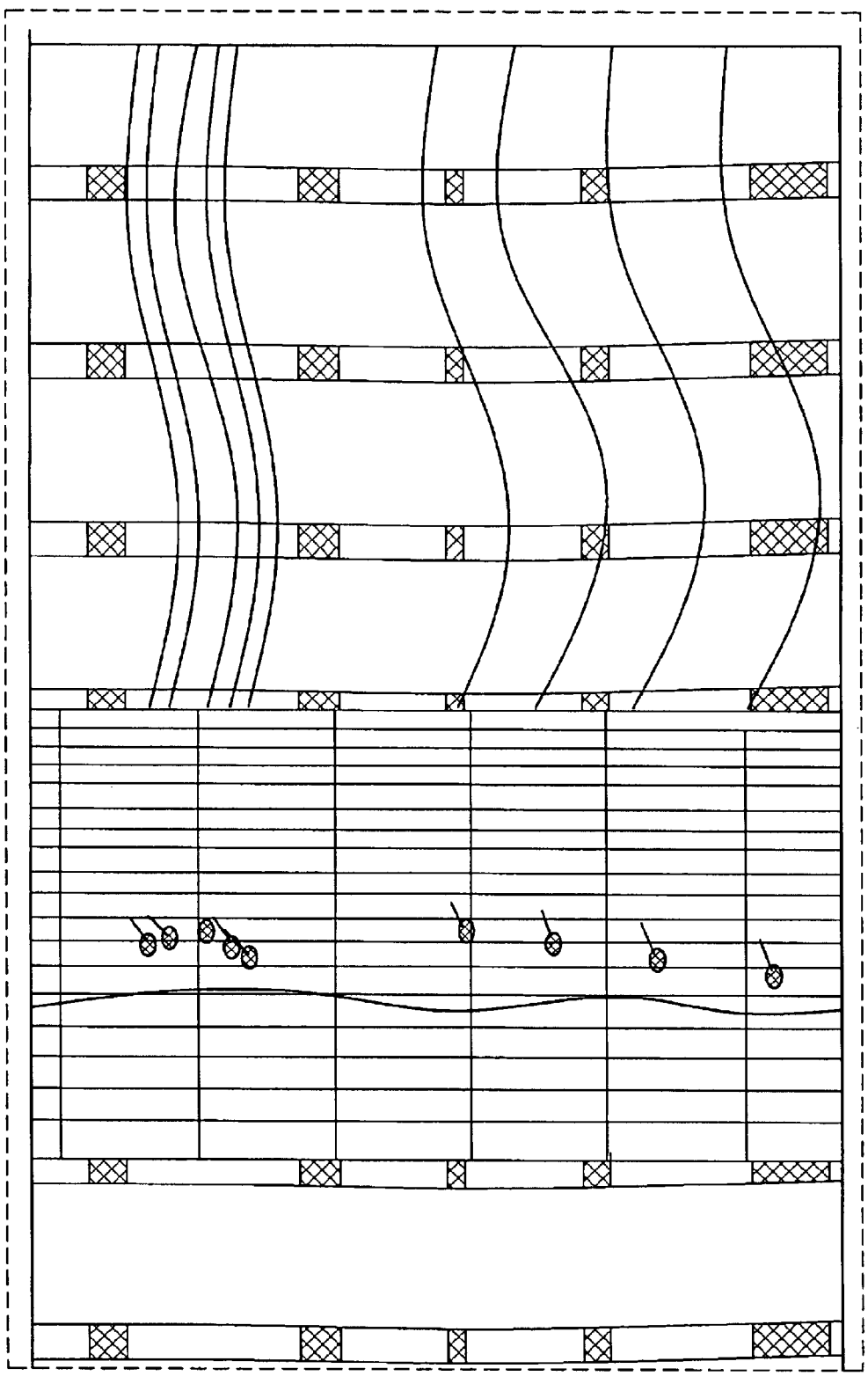
Figure 16A:
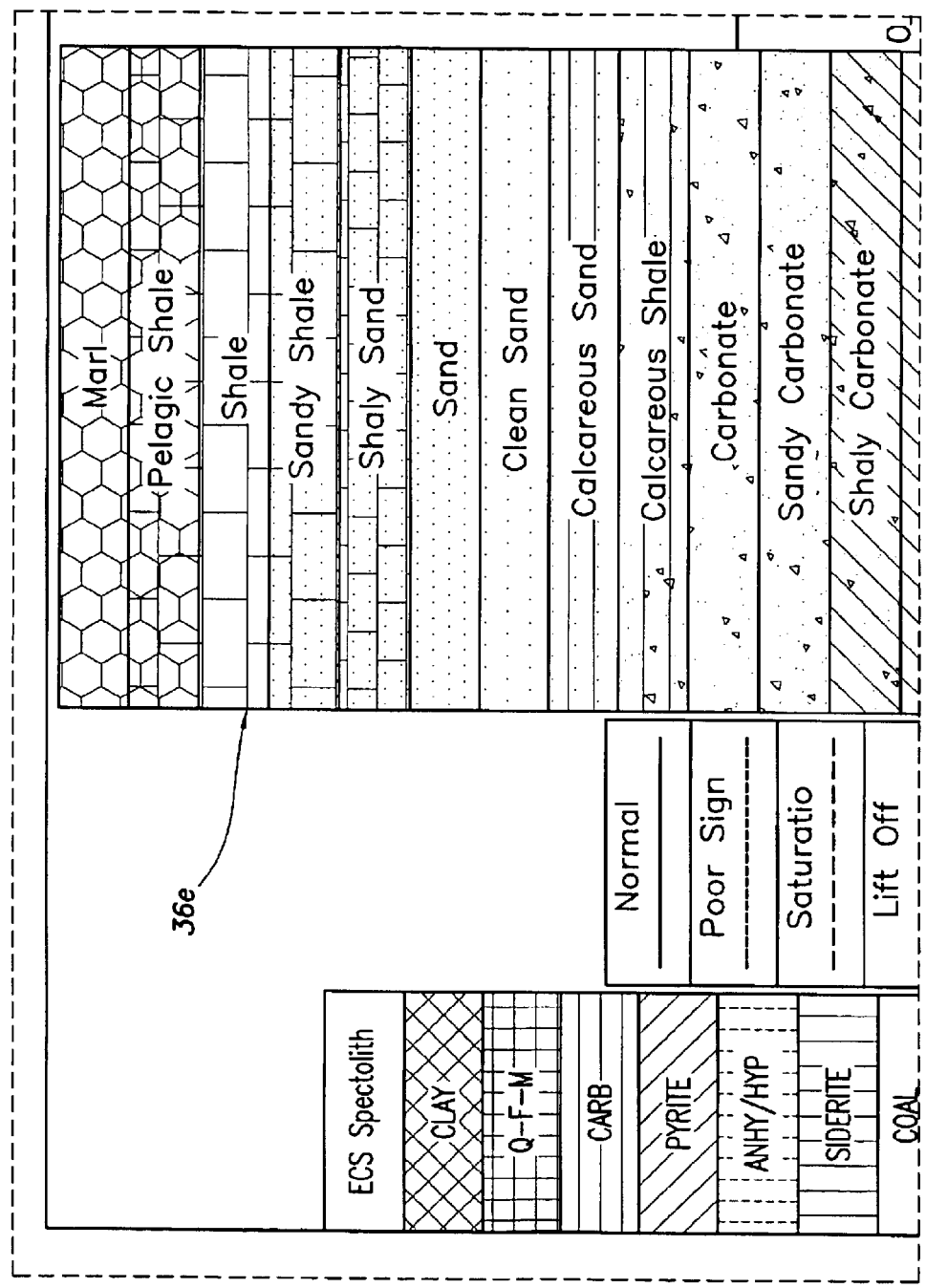
Figure 16B:
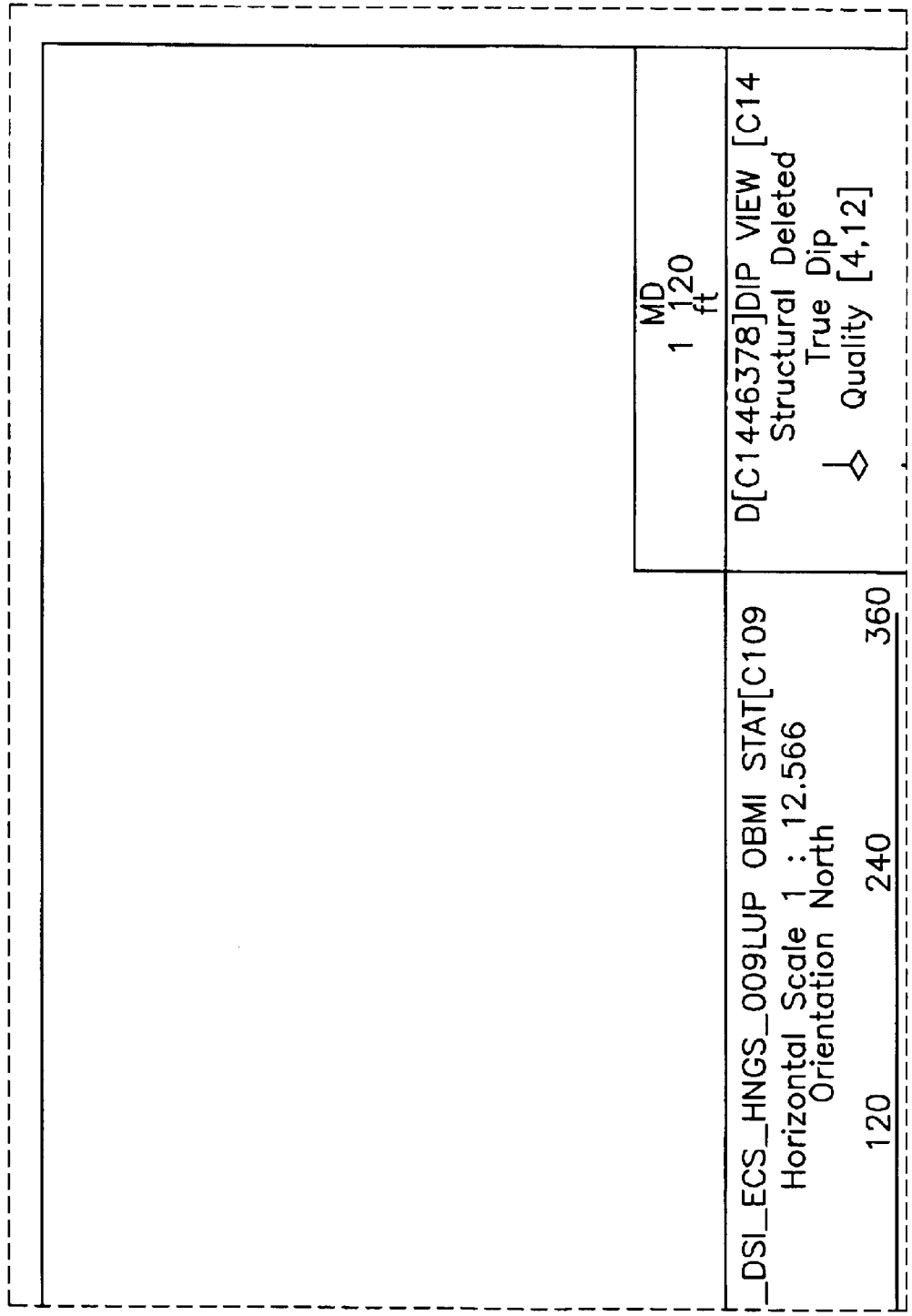
Figure 16C:
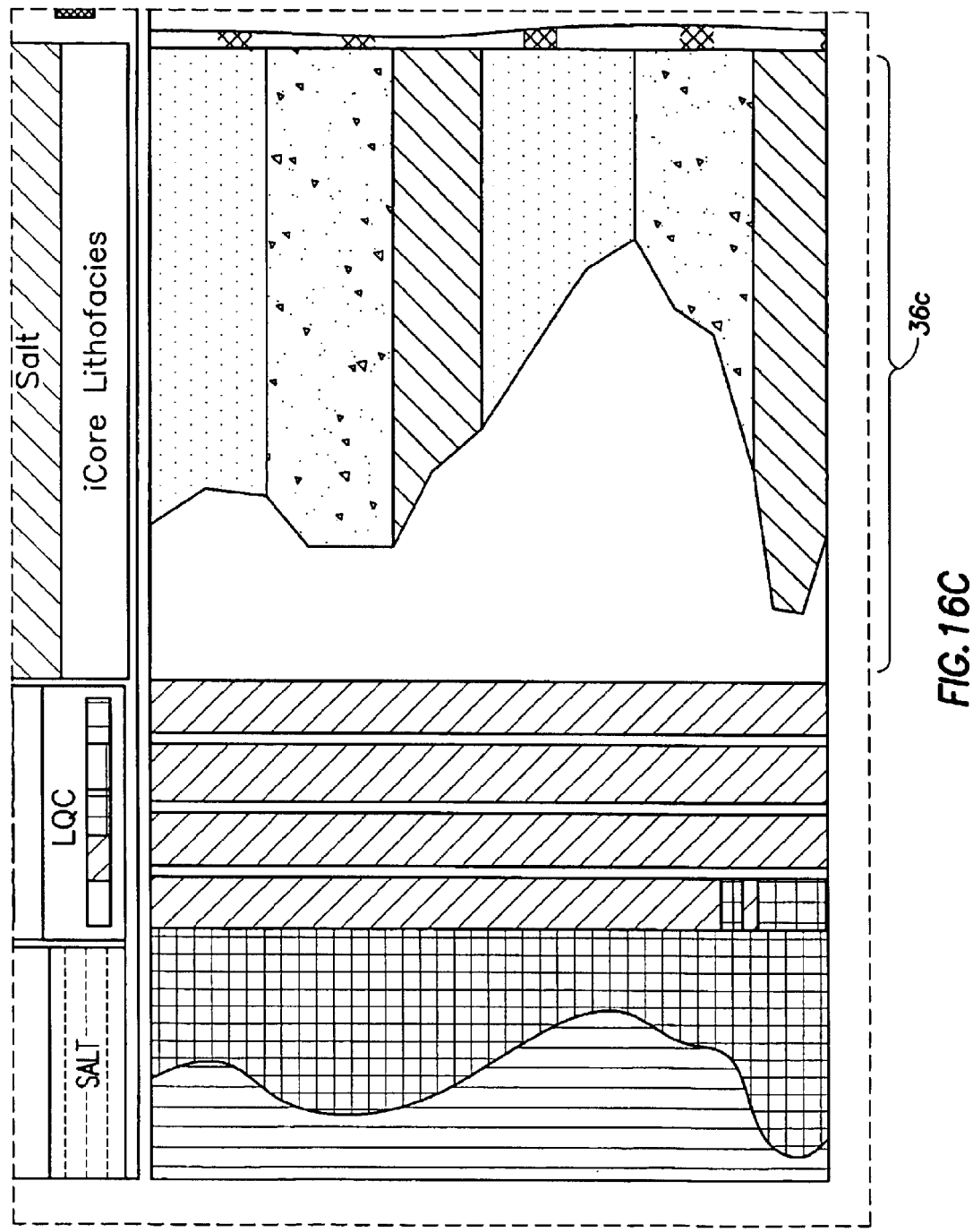
Figure 16D:
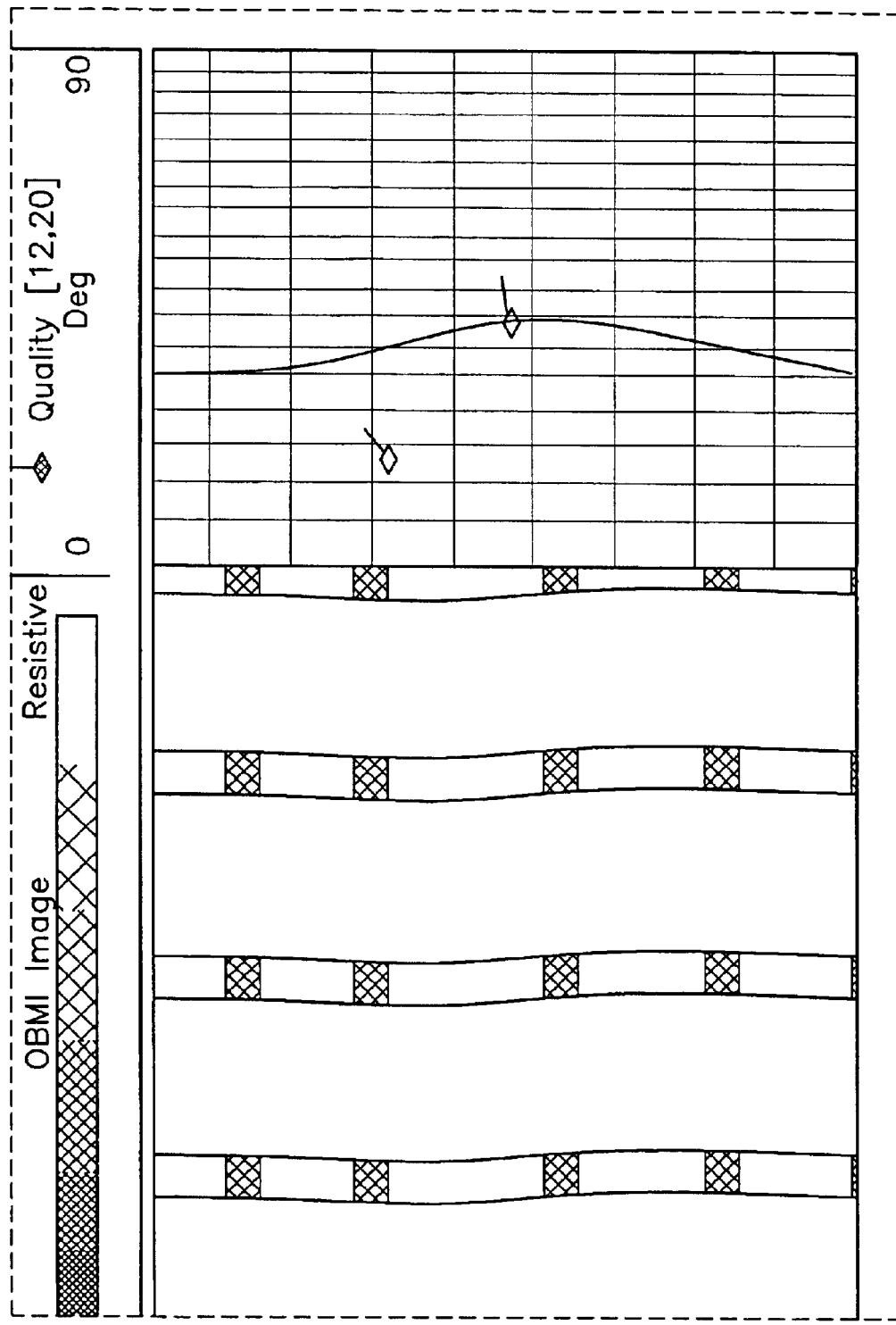
Figure 17:
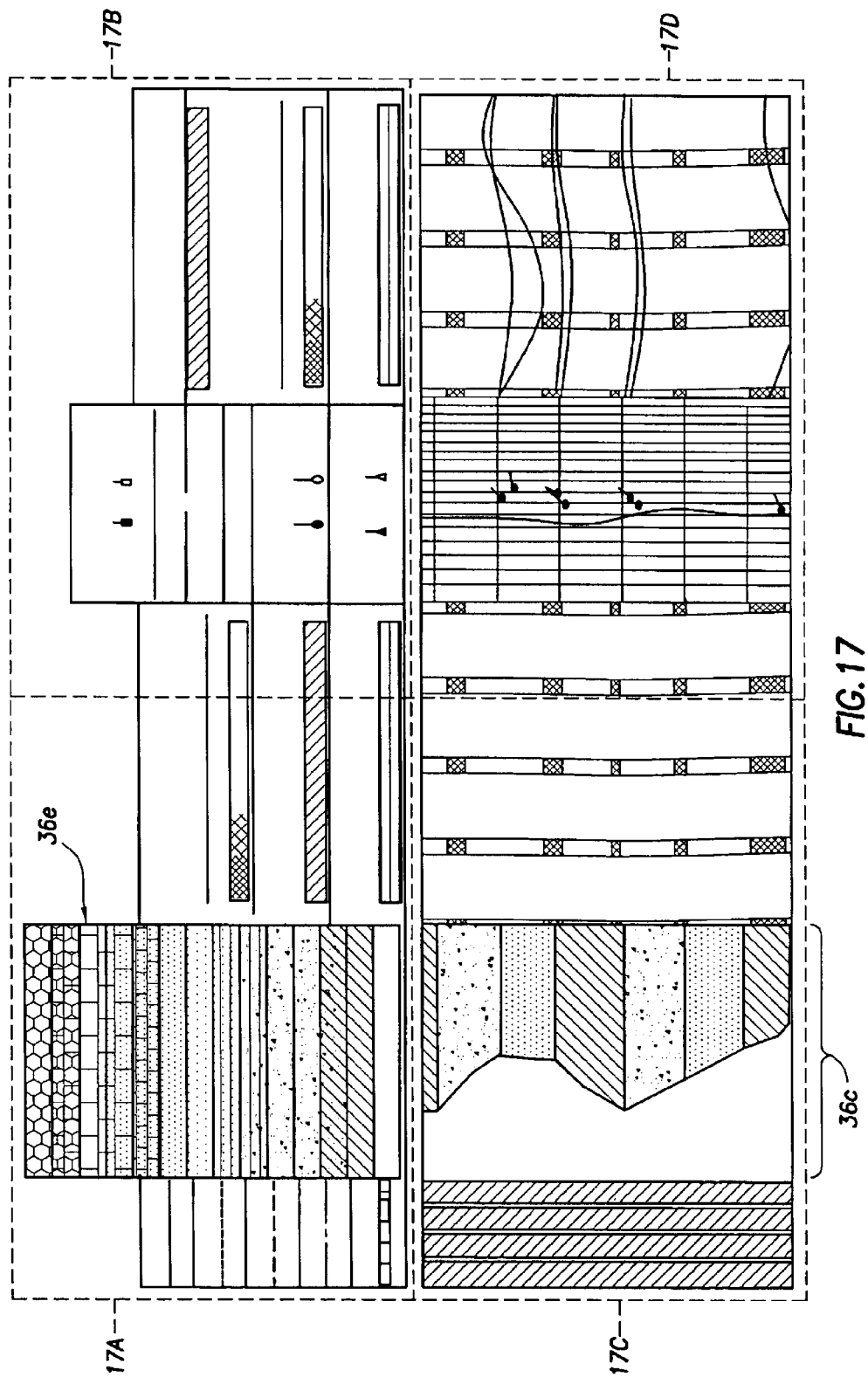
Figure 17A:
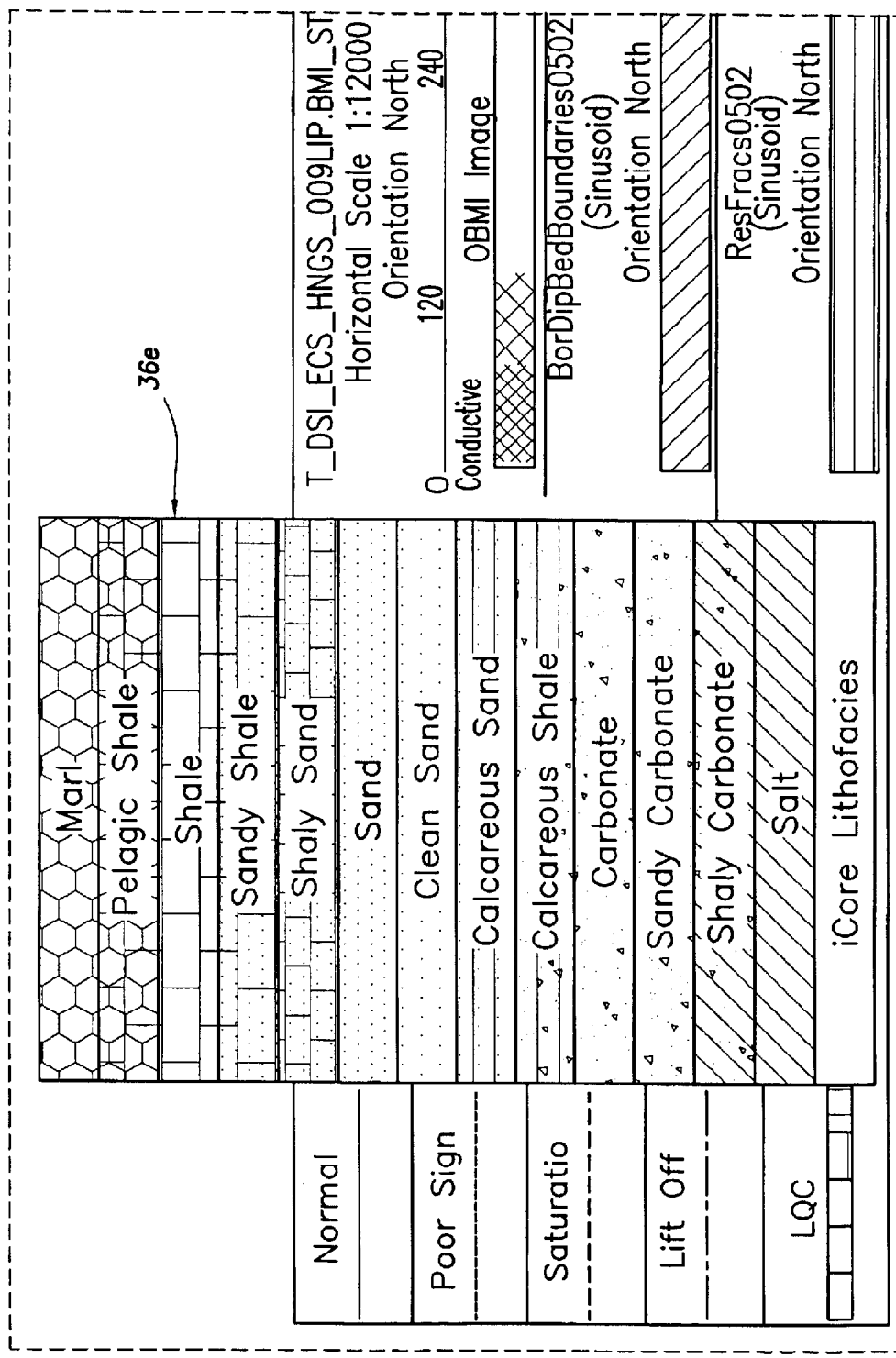
Figure 17B:
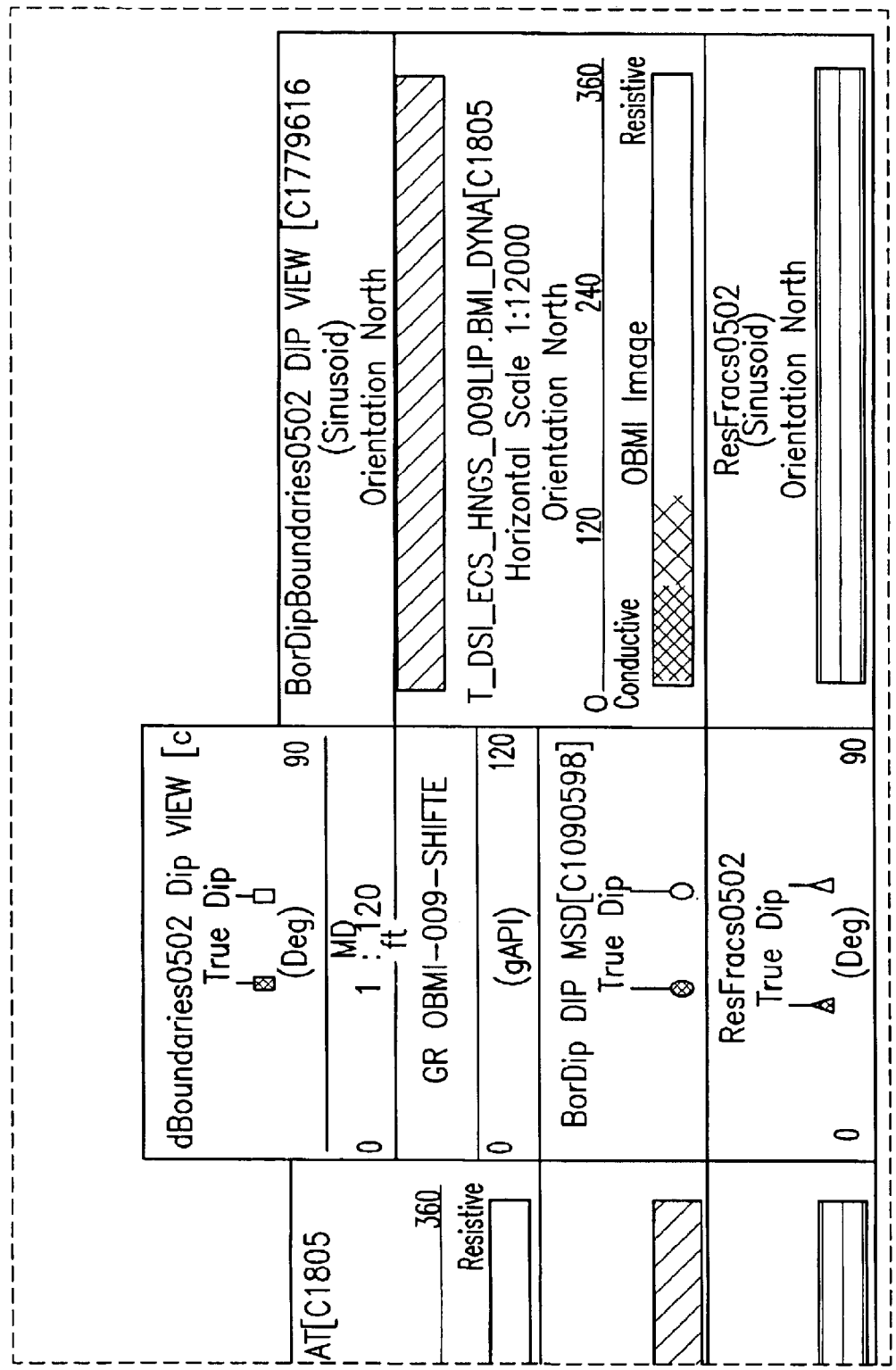
Figure 17C:
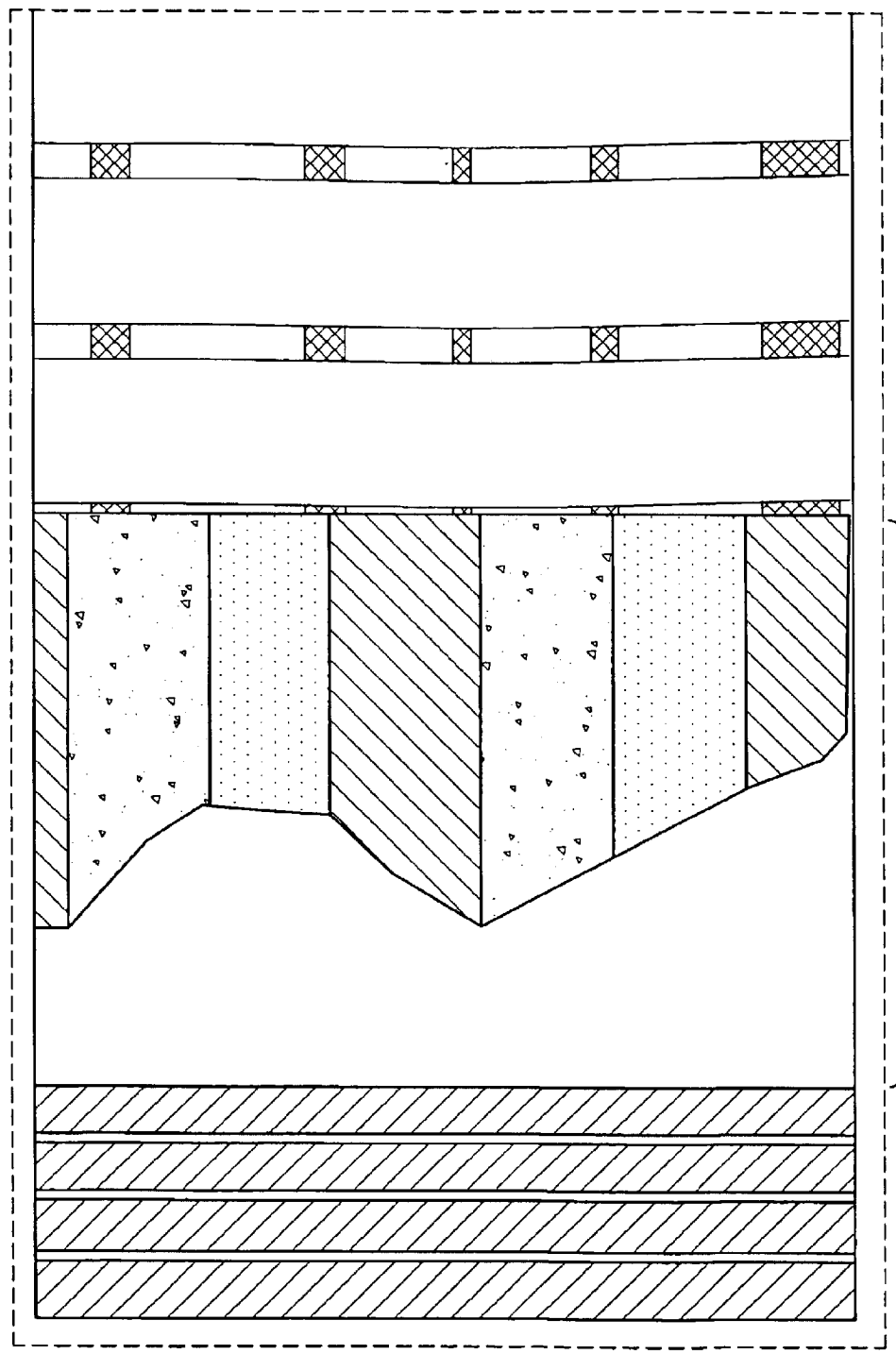
Figure 17D:
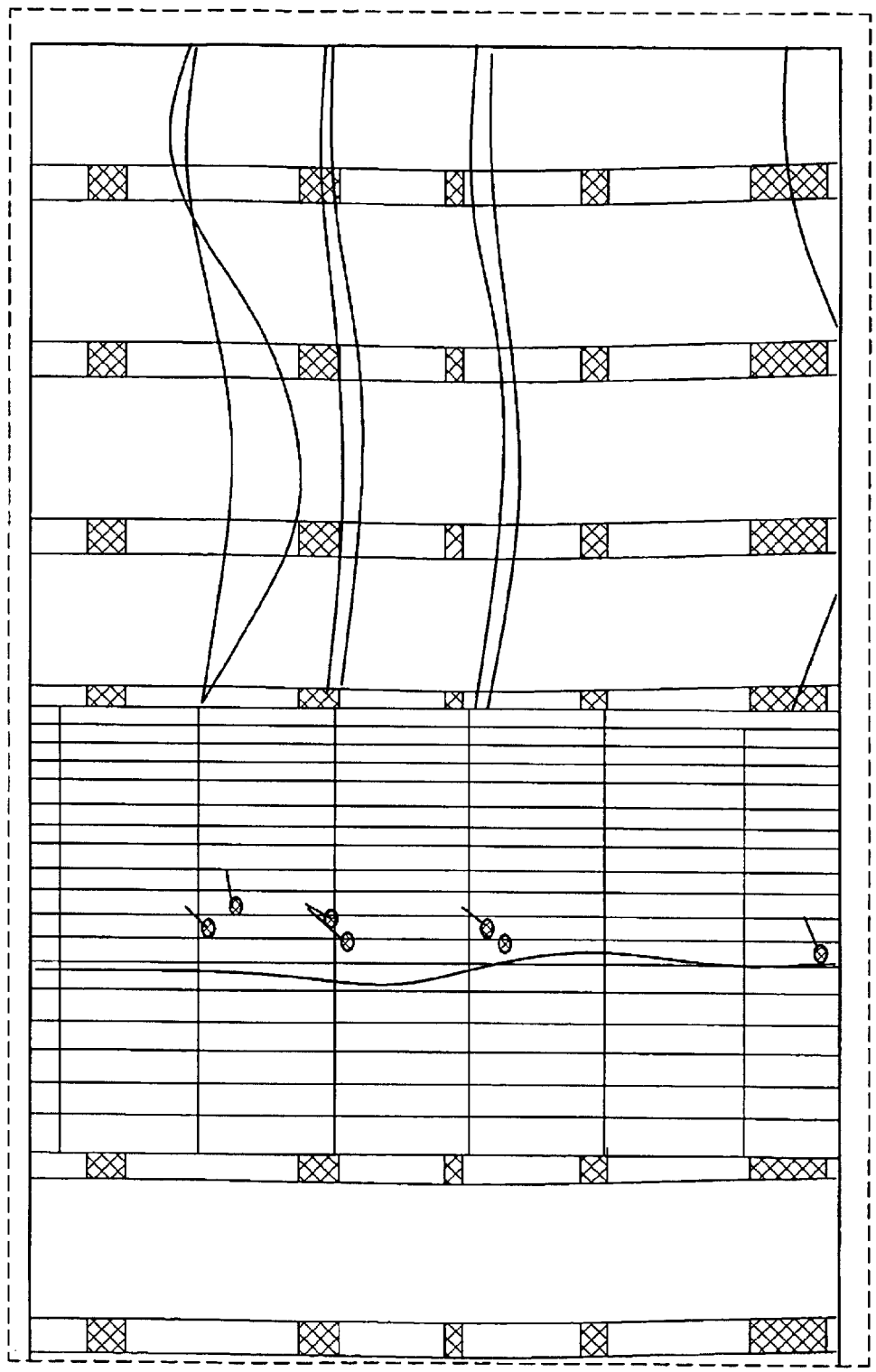

In FIGS. 13, 13A, 13B, 13C, and 13D, the 'Refined Lithofacies' log 36 (or 'iCore Lithfacies' log 36 or 'Refined Rock Classification' log 36) of FIGS. 11 and 12 is illustrated. In FIGS. 13, 13A, 13B, 13C, and 13D, the 'Refined Lithofacies' log 36 is comprised of four basic parts:

(1) an 'output generated by the ECS sonde 10' which is comprised of the percent dry weight of total Carbonate and the percent dry weight of total QFM and the percent dry weight of total Clay—see numeral 36a in FIG. 13

(2) a 'quality control track' generated by the OBMI tool 33—see numeral 36b in FIG. 13

(3) an 'actual Refined lithofacies' log which is generated by the 'micro-resistivity rules of iCore' 25 in FIG. 12A—see numeral 36c in FIG. 13

(4) 'four tracks' which are generated by the four pads of the OBMI tool 33 (of FIG. 10) including the first track 42, the second track 44, the third track 46, and the fourth track 48—see numeral 36d in FIG. 13

The 'actual Refined lithofacies' log 36c must be read in conjunction with the rock classification chart 36e which appears above the log 36c, the rock classification chart 36e in FIG. 13 including the following rock classifications: marl, pelagic shale, shale, sandy shale, shaly sand, sand, clean sand, calcareous sand, calcareous shale, carbonate, sandy carbonate, shaly carbonate and salt. A color and/or symbol area 36e1 appears with each 30 rock classification 36e. The color and/or symbol in that color and/or symbol area 36e1 must be read in conjunction with the rock classification (e.g., marl, etc) in the rock classification chart 36e. As a result, by reading the rock classification chart 36e in conjunction with the 'actual Refined Lithofacies log' 36c, and noting the colors and/or symbols associated with each rock classification in the color and/or symbol area 36e1 of the rock classification chart 36e, one can determine a rock classification at each wellbore depth of the 'actual Refined Lithofacies log' 36c, the rock classification being one of the following: marl, pelagic shale, shale, sandy shale, shaly sand, sand, clean sand, calcareous sand, calcareous shale, carbonate, sandy carbonate, shaly carbonate and salt. In addition, at each wellbore depth, one can also determine, from the log which appears adjacent to numeral 36a in FIG. 13 representing the output of the ECS sonde 10, the following information: the percent dry weight of total Carbonate, the percent dry weight of total QFM, and the percent dry weight of total Clay generated by the output of the ECS sonde 10. In addition, at each wellbore depth, one can also determine, from the four tracks 42, 44, 46, 48 associated with numeral 36d in FIG. 13, the following information: certain characteristics, such as resistivity, associated with the Earth formation appearing on the internal wall of the wellbore.

In FIGS. 14, 14A, 14B, 14C, 14D, 15, 15A, 15B, 15C, 15D, 16, 16A, 16B, 16C, 16D, 17, 17A, 17B, 17C, and 17D, other additional embodiments of the 'Refined Lithofacies' log 36 of FIG. 13 are illustrated.

A description of the functional operation of the Refined Lithofacies generation software 35 of FIG. 5 will be set forth in the following paragraph with reference to FIGS. 1 through 13 of the drawings.

Recall from FIG. 1 that the ECS sonde 10 will generate an output signal 14 which includes a 'plurality of data points' corresponding, respectively, to a 'plurality of depths' in the wellbore, where each data point is comprised of a percent dry weight of total carbonate and a percent dry weight of total QFM and a percent dry weight of total clay. Recall also that each of these data points will correspond to a particular rock classification, as illustrated in FIG. 3, in accordance with the rule base 18. Therefore, the 'plurality of the data points' 14 of FIG. 1 corresponding, respectively, to a 'plurality of depths' in the wellbore will further correspond, respectively, to a plurality of rock classifications. As noted in block 26 of FIG. 1, each rock classification can include one of twelve rock classifications, as follows: marl, pelagic shale, shale, sandy shale, shaly sand, sand, clean sand, calcareous sand, calcareous shale, carbonate, sandy carbonate, and shaly carbonate. Therefore, in FIG. 5, the output of the ECS sonde 10 includes the 'plurality of data points' corresponding, respectively, to a 'plurality of depths' in the wellbore, where (using the Ternary Diagram Model 30 of FIG. 2 and the rule base 18 of FIG. 3) the 'plurality of data points' will correspond, respectively, to a 'plurality of rock classifications', there being one rock classification for each data point. As a result, in FIG. 11, recalling that the second rule base 34 of the Refined Lithofacies generation software 35 receives a first input consisting of the output of the ECS sonde 10 and a second input consisting of the rule base 18, the second rule base 34 of the Refined Lithofacies generation software 35 will therefore calculate and determine the 'rock classification table' 22 of FIG. 12A in the same manner as discussed above with reference to FIG. 4 of the drawings, the 'rock classification table' 22 including a 'plurality of data points' corresponding, respectively, to a 'plurality of depths' in the wellbore, the 'plurality of data points' further corresponding, respectively, to a 'plurality of rock classifications' (such as the rock classifications of FIG. 3). As a result, in FIG. 12A, the second rule base 34 has determined the 'rock classification table' 22 (of FIG. 1) comprised of a plurality of rock classifications corresponding, respectively, to a 'plurality of depths' in the wellbore.

The second rule base 34 of FIG. 12A also receives a third input consisting of the four tracks 42, 44, 46, 48 of FIG. 10 and 11 which are output from the OBMI sonde 33 of FIGS. 5 and 11. Recall from FIGS. 6, 7, 8, and 9 that the OBMI sonde 33 includes a pad section 33b, the pad section 33b including four pads 33b1–33b4, each pad 33b–33b4 including five button pairs, where each button pair generates a resistivity curve when the the pads 33b1–33b4 touch the sides of the wellbore wall and the OBMI sonde 33 is pulled upwardly in the wellbore as shown in FIG. 9. Therefore, the five button pairs on each pad 33b1–33b4 will generate and record five resistivity curves as a function of depth in a wellbore, one resistivity curve being generated for each button pair on each pad 33b–33b4. However, since each pad 33b1–33b4 will generate a 'track' 42–48, each 'track' 42–48 of FIG. 10 will therefore include five resistivity curves. As a result, each resistivity curve generated by each pad 33b1–33b4 of the OBMI sonde 33 will provide a value of resistivity (or micro-resistivity) as a function of depth in the wellbore.

As noted earlier, since the 'second rule base' 34 of the Refined Lithofacies generation software 35 of FIG. 12A receives a first input consisting of the output of the ECS sonde 10 and a second input consisting of the rule base 18, the 'second rule base' 34 of FIG. 12A has therefore calculated and determined a 'plurality of rock classifications' in the rock classification table 22 of FIG. 12A corresponding, respectively, to: (1) the 'plurality of data points' output from the ECS sonde 10, and (2) to a 'plurality of depths' in a wellbore.

However, in addition, in FIG. 12A, since the 'second rule base' 34 also receives a third input consisting of the four tracks 42, 44, 46, 48 of FIGS. 10 and 11 which are output from the OBMI sonde 33 of FIGS. 5 and 11, the 'second rule base' has also determined a 'plurality of values of micro-resistivity' corresponding, respectively, to a 'plurality of depths' in the wellbore.

Therefore, in FIGS. 12A and 12B, at each level of depth in the wellbore, the 'micro-resistivity rules for iCore' 25 have received the following 'particular information':

Particular Information received by the Micro-resistivity Rules of iCore 25

(1) a rock classification (such as one of the rock classifications shown in FIG. 3), and (2) a value of micro-resistivity.

In FIG. 12B, locate items 1, 2, 3, and 4. In FIG. 12B, the 'micro-resistivity rules for iCore' 25 include a plurality of rules in items 1 through 4 which will now be used interpret the above referenced 'particular information' which was received by the 'micro-resistivity rules of iCore' 25. In FIG. 12B, after performing a filtering function (see item 1 in FIG. 12B), determine a 'micro-resistivity cut-off value' and then classify each of the plurality of values of micro-resistivity (provided by the tracks of the OBMI sonde 33) into a 'high' value or a 'low' value (see item 2 in FIG. 12B). Since a plurality of values of micro-resistivity will correspond, respectively, to a plurality of depths in the wellbore, the plurality of values of micro-resistivity will now be split into two groups: a group of 'high' values of micro-resistivity, and a group of 'low' values of micro-resistivity (see item 2 in FIG. 12B). For each level of depth in the wellbore, if the rock classification is either Clean Sand or Sand or Shaly Sand or Calcareous Sand or Carbonate and if the micro-resistivity value is classified to be 'low' based on the 'micro-resistivity cut-off value', then, at that level of depth in the wellbore, shale bedding overrides—that is, shale bedding is the rock classification (see item 3 in FIG. 12B). However, for each level of depth in the wellbore, if the rock classification is either Pelagic Shale or Shale or Sandy Shale or Calcareous Shale and if the micro-resistivity value is classified to be 'high', then, at that level of depth in the wellbore, sand bedding overrides—that is, sand bedding is the rock classification (see item 4 in FIG. 12B). Therefore, at each level of depth in the wellbore, the rock classification, which was determined for that depth by using the Ternary Model Diagram 30 of FIG. 2 and the rule base 18 of FIG. 3, must now be further interpreted in accordance with the rules set forth in the 'micro-resistivity rules of iCore' illustrated in FIG. 12B as follows:

| Rock classification | resistivity value low or high | determined classification |
| --- | --- | --- |
| Clean Sand | low | shale bedding overrides |
| Sand | low | " |
| Shaly Sand | low | " |
| Calcareous Sand | low | " |
| Carbonate | low | " |
| Pelagic Shale | high | sand bedding overrides |
| Shale | high | " |
| Sandy Shale | high | " |
| Calcareous Shale | high | " |

For example, using the above referenced 'micro-resistivity rules of iCore' 25, if the rock classification for a particular depth in a wellbore is determined (by using the Ternary Model Diagram 30 of FIG. 2 and the rule base 18 of FIG. 3) to be 'Clean Sand' but the resistivity value of the Earth formation at that depth in the wellbore is determined to be 'low' (when compared to the previously defined 'micro-resistivity cut-off value'), then, the rock classification at that depth will be determined to be 'shale bedding', since shale bedding overrides.

In FIGS. 5 and 13, the Refined Lithofacies Generation Software 35 of FIG. 5 will now take into account the above referenced rules set forth in the 'micro-resistivity rules of iCore' 25 of FIG. 12B when the colors and/or symbols in the 'actual Refined Lithofacies log' 36c of FIG. 13 are determined at each level of depth in the wellbore and when the rock classifications in box 36e of FIG. 13 are determined.

As a result, in FIG. 13, the 'actual Refined Lithofacies log' 36c will be determined by the 'micro-resistivity rules for iCore' 25 of FIG. 12A since the 'actual Refined Lithofacies log' 36c can be read to determine a rock classification at each level of depth in the wellbore, the rock classification being one of the rock classifications shown in FIG. 3 of the drawings and shown in box 36e of FIG. 13. However, at least some of those rock classifications of FIG. 3 have been re-interpreted to be either shale bedding or sand bedding in view of the 'micro-resistivity rules of iCore' 25 of FIG. 12B.

In FIG. 13, in the 'Refined Lithofacies log' 36, we have now discussed how the 'actual Refined Lithofacies log 36c' portion of the 'Refined Lithofacies log' 36 of FIG. 13 has been determined. However, in addition, the 'output generated by the ECS sonde 36a' portion of the 'Refined Lithofacies log' 36 of FIG. 13 originates from the ECS sonde 10 of FIG. 12A. In addition, the 'four tracks 36d' portion of the 'Refined Lithofacics log' 36 of FIG. 13 originates from the OBMI Sonde 33 of FIG. 12A.

Although this specification discloses the use of an ECS sonde 10 and an OBMI sonde 33 in connection with the first rock classification system of FIGS. 1 through 4, in accordance with one aspect of the present invention, and the second rock classifications system of FIGS. 5 through 13, in accordance with another aspect of the present invention, any other types of wellbore logging tools or sondes could be used in lieu of the ECS sonde 10 and/or the OBMI sonde 33 in connection with the first and second rock classification systems, provided however, that these other wellbore logging tools or sondes must be able to generate the necessary outputs that are required by the computer systems in FIGS. 1 and 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for generating a plurality of rock classifications corresponding, respectively, to a plurality of depths in a wellbore, comprising the steps of:

(a) receiving a value indicative of a percent dry weight of total carbonate and a percent dry weight of total QFM and a percent dry weight of total clay for each of the plurality of depths in the wellbore, a plurality of values being received corresponding, respectively, to the plurality of depth in said wellbore;

(b) comparing a particular one of said plurality of values at a particular depth in said wellbore with a plurality of rules in a rule base, the plurality of rules corresponding, respectively, to a plurality of rock classifications;

(c) when a match is found between said particular one of said plurality of values and one of said plurality of rules in said rule base, determining a particular rock classification which corresponds to said one of said plurality of rules in said rule base; and (d) associating said particular one of said plurality of values at said particular depth in said wellbore with said particular rock classification.

2. The method of claim 1, wherein the associating step (d) comprises the further step of associating said plurality of values at a respective plurality of depths in said wellbore with a corresponding plurality of rock classifications.

3. The method of claim 1, wherein one of said plurality of rock classifications include Marl, and wherein one of said plurality of rules in said rule base corresponding to the Marl rock classification defines a percent dry weight of total Clay as being greater than or equal to approximately 0.35 and less than or equal to approximately 0.65 and defines a percent dry weight of total Carbonate as being greater than or equal to approximately 0.35 and less than or equal to approximately 0.65.

4. The method of claim 1, wherein one of said plurality of rock classifications include Pelagic Shale, and wherein one of said plurality of rules in said rule base corresponding to the Pelagic Shale rock classification defines a percent dry weight of total clay as being greater than or equal to approximately 0.7.

5. The method of claim 1, wherein one of said plurality of rock classifications include Shale, and wherein one of said plurality of rules in said rule base corresponding to the Shale rock classification defines a percent dry weight of total clay as being greater than or equal to approximately 0.6 and less than approximately 0.7 and a percent dry weight of total QFM as being greater than or equal to a percent dry weight of total carbonate.

6. The method of claim 1, wherein one of said plurality of rock classifications include Sandy Shale, and wherein one of said plurality of rules in said rule base corresponding to the Sandy Shale rock classification defines a percent dry weight of total clay as being greater than or equal to approximately 0.5 and less than approximately 0.6 and a percent dry weight of total QFM as being greater than or equal to a percent dry weight of total carbonate.

7. The method of claim 1, wherein one of said plurality of rock classifications include Shaly Sand, and wherein one of said plurality of rules in said rule base corresponding to the Shaly Sand rock classification defines a percent dry weight of total QFM as being greater than or equal to approximately 0.5 and less than approximately 0.7 and a percent dry weight of total clay as being greater than or equal to a percent dry weight of total carbonate.

8. The method of claim 1, wherein one of said plurality of rock classifications include Sand, and wherein one of said plurality of rules in said rule base corresponding to the Sand rock classification defines a percent dry weight of total QFM as being greater than or equal to approximately 0.7 and less than approximately 0.9 and a percent dry weight of total clay as being greater than or equal to a percent dry weight of total carbonate.

9. The method of claim 1, wherein one of said plurality of rock classifications include Clean Sand, and wherein one of said plurality of rules in said rule base corresponding to the Clean Sand rock classification defines a percent dry weight of total QFM as being greater than or equal to approximately 0.9.

10. The method of claim 1, wherein one of said plurality of rock classifications include Calcareous Sand, and wherein one of said plurality of rules in said rule base corresponding to the Calcareous Sand rock classification defines a percent dry weight of total QFM as being greater than or equal to approximately 0.5 and less than approximately 0.9 and a percent dry weight of total carbonate as being greater than a percent dry weight of total clay.

11. The method of claim 1, wherein one of said plurality of rock classifications include Calcareous Shale, and wherein one of said plurality of rules in said rule base corresponding to the Calcareous Shale rock classification defines a percent dry weight of total clay as being greater than or equal to approximately 0.5 and less than approximately 0.7 and a percent dry weight of total carbonate as being greater than a percent dry weight of total QFM.

12. The method of claim 1, wherein one of said plurality of rock classifications include Carbonate, and wherein one of said plurality of rules in said rule base corresponding to the Carbonate rock classification defines a percent dry weight of total carbonate as being greater than or equal to approximately 0.5.

13. The method of claim 1, wherein one of said plurality of rock classifications include Sandy Carbonate, and wherein one of said plurality of rules in said rule base corresponding to the Sandy Carbonate rock classification defines a percent dry weight of total carbonate as being greater than the percent dry weight of total QFM, the percent dry weight of total QFM being greater than or equal to the percent dry weight of total clay.

14. The method of claim 1, wherein one of said plurality of rock classifications include Shaly Carbonate, and wherein one of said plurality of rules in said rule base corresponding to the Shaly Carbonate rock classification defines a percent dry weight of total carbonate as being greater than the percent dry weight of total clay, the percent dry weight of total clay being greater than the percent dry weight of total QFM.

15. The method of claim 2, further comprising the steps of:

(e) receiving said plurality of rock classifications corresponding, respectively, to said plurality of depths in said wellbore;

(f) receiving a plurality of values of resistivity corresponding, respectively, to said plurality of depths in said wellbore, said plurality of rock classifications corresponding, respectively, to said plurality of values of resistivity, each rock classification at each depth in the wellbore having a corresponding value of resistivity;

(g) determining a resistivity cut-off value from among said plurality of values of resistivity; and (h) comparing each of said plurality of values of resistivity with said resistivity cut-off value and, responsive to the comparing step (h), classifying each of said plurality of values of resistivity in either a first group of low resistivity values or a second group of high resistivity values, each of the plurality of values of resistivity being either a low resistivity value or a high resistivity value.

16. The method of claim 15, further comprising the step of:

(i) if a first particular one of said plurality of rock classifications at a particular depth in said wellbore is either Clean Sand or Sand or Shaly Sand or Calcareous Sand or Carbonate, and if the resistivity value associated with said first particular one of said plurality of rock classifications lies within said first group of low resistivity values, determining said first particular one of said plurality of rock classifications to be a shale bedding.

17. The method of claim 16, further comprising the step of:

(j) if a second particular one of said plurality of rock classifications at a particular depth in said wellbore is either Pelagic Shale or Shale or Sandy Shale or Calcareous Shale, and if the resistivity value associated with said second particular one of said plurality of rock classifications lies within said second group of high resistivity values, determining said second particular one of said plurality of rock classifications to be a sand bedding.

18. A program storage device readable by a machine, tangibly embodying a program of instructions executable by the machine, to perform method steps for generating a plurality of rock classifications corresponding, respectively, to a plurality of depths in a wellbore, said method steps comprising:

(a) receiving a value indicative of a percent dry weight of total carbonate and a percent dry weight of total QFM and a percent dry weight of total clay for each of the plurality of depths in the wellbore, a plurality of values being received corresponding, respectively, to the plurality of depth in said wellbore;

(b) comparing a particular one of said plurality of values at a particular depth in said wellbore with a plurality of rules in a rule base, the plurality of rules corresponding, respectively, to a plurality of rock classifications;

(c) when a match is found between said particular one of said plurality of values and one of said plurality of rules in said rule base, determining a particular rock classification which corresponds to said one of said plurality of rules in said rule base; and (d) associating said particular one of said plurality of values at said particular depth in said wellbore with said particular rock classification.

19. The program storage device of claim 18, wherein the associating step (d) comprises the further step of associating said plurality of values at a respective plurality of depths in said wellbore with a corresponding plurality of rock classifications.

20. The program storage device of claim 18, wherein one of said plurality of rock classifications include Marl, and wherein one of said plurality of rules in said nile base corresponding to the Marl rock classification defines a percent dry weight of total Clay as being greater than or equal to approximately 0.35 and less than or equal to approximately 0.65 and defines a percent dry weight of total Carbonate as being greater than or equal to approximately 0.35 and less than or equal to approximately 0.65.

21. The program storage device of claim 18, wherein one of said plurality of rock classifications include Pelagic Shale, and wherein one of said plurality of rules in said rule base corresponding to the Pelagic Shale rock classification defines a percent dry weight of total clay as being greater than or equal to approximately 0.7.

22. The program storage device of claim 18, wherein one of said plurality of rock classifications include Shale, and wherein one of said plurality of rules in said rule base corresponding to the Shale rock classification defines a percent dry weight of total clay as being greater than or equal to approximately 0.6 and less than approximately 0.7 and a percent dry weight of total QFM as being greater than or equal to a percent dry weight of total carbonate.

23. The program storage device of claim 18, wherein one of said plurality of rock classifications include Sandy Shale, and wherein one of said plurality of rules in said rule base corresponding to the Sandy Shale rock classification defines a percent dry weight of total clay as being greater than or equal to approximately 0.5 and less than approximately 0.6 and a percent dry weight of total QFM as being greater than or equal to a percent dry weight of total carbonate.

24. The program storage device of claim 18, wherein one of said plurality of rock classifications include Shaly Sand, and wherein one of said plurality of rules in said rule base corresponding to the Shaly Sand rock classification defines a percent dry weight of total QFM as being greater than or equal to approximately 0.5 and less than approximately 0.7 and a percent dry weight of total clay as being greater than or equal to a percent dry weight of total carbonate.

25. The program storage device of claim 18, wherein one of said plurality of rock classifications include Sand, and wherein one of said plurality of rules in said rule base corresponding to the Sand rock classification defines a percent dry weight of total QFM as being greater than or equal to approximately 0.7 and less than approximately 0.9 and a percent dry weight of total clay as being greater than or equal to a percent dry weight of total carbonate.

26. The program storage device of claim 18, wherein one of said plurality of rock classifications include Clean Sand, and wherein one of said plurality of rules in said rule base corresponding to the Clean Sand rock classification defines a percent dry weight of total QFM as being greater than or equal to approximately 0.9.

27. The program storage device of claim 18, wherein one of said plurality of rock classifications include Calcareous Sand, and wherein one of said plurality of rules in said rule base corresponding to the Calcareous Sand rock classification defines a percent dry weight of total QFM as being greater than or equal to approximately 0.5 and less than approximately 0.9 and a percent dry weight of total carbonate as being greater than a percent dry weight of total clay.

28. The program storage device of claim 18, wherein one of said plurality of rock classifications include Calcareous Shale, and wherein one of said plurality of rules in said rule base corresponding to the Calcareous Shale rock classification defines a percent dry weight of total clay as being greater than or equal to approximately 0.5 and less than approximately 0.7 and a percent dry weight of total carbonate as being greater than a percent dry weight of total QFM.

29. The program storage device of claim 18, wherein one of said plurality of rock classifications include Carbonate, and wherein one of said plurality of rules in said rule base corresponding to the Carbonate rock classification defines a percent dry weight of total carbonate as being greater than or equal to approximately 0.5.

30. The program storage device of claim 18, wherein one of said plurality of rock classifications include Sandy Carbonate, and wherein one of said plurality of rules in said rule base corresponding to the Sandy Carbonate rock classification defines a percent dry weight of total carbonate as being greater than the percent dry weight of total QFM, the percent dry weight of total QFM being greater than or equal to the percent dry weight of total clay.

31. The program storage device of claim 18, wherein one of said plurality of rock classifications include Shaly Carbonate, and wherein one of said plurality of rules in said rule base corresponding to the Shaly Carbonate rock classification defines a percent dry weight of total carbonate as being greater than the percent dry weight of total clay, the percent dry weight of total clay being greater than the percent dry weight of total QFM.

32. The program storage device of claim 19, said method steps further comprising:

(e) receiving said plurality of rock classifications corresponding, respectively, to said plurality of depths in said wellbore;

(f) receiving a plurality of values of resistivity corresponding, respectively, to said plurality of depths in said wellbore, said plurality of rock classifications corresponding, respectively, to said plurality of values of resistivity, each rock classification at each depth in the wellbore having a corresponding value of resistivity;

(g) determining a resistivity cut-off value from among said plurality of values of resistivity; and (h) comparing each of said plurality of values of resistivity with said resistivity cut-off value and, responsive to the comparing step (h), classifying each of said plurality of values of resistivity in either a first group of low resistivity values or a second group of high resistivity values, each of the plurality of values of resistivity being either a low resistivity value or a high resistivity value.

33. The program storage device of claim 32, said method steps further comprising:

(i) if a first particular one of said plurality of rock classifications at a particular depth in said wellbore is either Clean Sand or Sand or Shaly Sand or Calcareous Sand or Carbonate, and if the resistivity value associated with said first particular one of said plurality of rock classifications lies within said first group of low resistivity values, determining said first particular one of said plurality of rock classifications to be a shale bedding.

34. The program storage device of claim 33, said method steps further comprising:

(j) if a second particular one of said plurality of rock classifications at a particular depth in said wellbore is either Pelagic Shale or Shale or Sandy Shale or Calcareous Shale, and if the resistivity value associated with said second particular one of said plurality of rock classifications lies within said second group of high resistivity values, determining said second particular one of said plurality of rock classifications to be a sand bedding.

35. A method of determining a plurality of final rock classifications in response to a respective plurality of preliminary rock classifications and a respective plurality of micro-resistivity values associated, respectively, with a plurality of depths in a wellbore, comprising the steps of:

(a) determining a resistivity cut-off value from among said plurality of micro-resistivity values; and (b) comparing each of said plurality of micro-resistivity values with said resistivity cut-off value and, responsive to the comparing step (b), classifying each of said plurality of micro-resistivity values in either a first group of low resistivity values or a second group of high resistivity values, each of the plurality of micro-resistivity values being either a low resistivity value or a high resistivity value.

36. The method of claim 35, said method steps further comprising:

(c) if a first particular one of said plurality of preliminary rock classifications at a particular depth in said wellbore is either Clean Sand or Sand or Shaly Sand or Calcareous Sand or Carbonate, and if the micro-resistivity value associated with said first particular one of said plurality of preliminary rock classifications lies within said first group of low resistivity values, determining said first particular one of said plurality of preliminary rock classifications to be a shale bedding.

37. The method of claim 36, said method steps further comprising:

(d) if a second particular one of said plurality of preliminary rock classifications at a particular depth in said wellbore is either Pelagic Shale or Shale or Sandy Shale or Calcareous Shale, and if the micro-resistivity value associated with said second particular one of said plurality of preliminary rock classifications lies within said second group of high resistivity values, determining said second particular one of said plurality of preliminary rock classifications to be a sand bedding.

38. A program storage device readable by a machine, tangibly embodying a program of instructions executable by the machine, to perform method steps for determining a plurality of final rock classifications in response to a respective plurality of preliminary rock classifications and a respective plurality of micro-resistivity values associated, respectively, with a plurality of depths in a wellbore, said method steps comprising:

(a) determining a resistivity cut-off value from among said plurality of micro-resistivity values; and (b) comparing each of said plurality of micro-resistivity values with said resistivity cut-off value and, responsive to the comparing step (b), classifying each of said plurality of micro-resistivity values in either a first group of low resistivity values or a second group of high resistivity values, each of the plurality of micro-resistivity values being either a low resistivity value or a high resistivity value.

39. The program storage device of claim 38, said method steps further comprising:

(c) if a first particular one of said plurality of preliminary rock classifications at a particular depth in said wellbore is either Clean Sand or Sand or Shaly Sand or Calcareous Sand or Carbonate, and if the micro-resistivity value associated with said first particular one of said plurality of preliminary rock classifications lies within said first group of low resistivity values, determining said first particular one of said plurality of preliminary rock classifications to be a shale bedding.

40. The program storage device of claim 39, said method steps further comprising:

(d) if a second particular one of said plurality of preliminary rock classifications at a particular depth in said wellbore is either Pelagic Shale or Shale or Sandy Shale or Calcareous Shale, and if the micro-resistivity value associated with said second particular one of said plurality of preliminary rock classifications lies within said second group of high resistivity values, determining said second particular one of said plurality of preliminary rock classifications to be a sand bedding.

* * * * *